United States Patent
Shimizu

(10) Patent No.: US 9,341,766 B2
(45) Date of Patent: May 17, 2016

(54) LIGHTING DEVICE, DISPLAY DEVICE AND TELEVISION DEVICE

(75) Inventor: Takaharu Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 405 days.

(21) Appl. No.: 13/701,835

(22) PCT Filed: Apr. 21, 2011

(86) PCT No.: PCT/JP2011/059796
§ 371 (c)(1),
(2), (4) Date: Dec. 4, 2012

(87) PCT Pub. No.: WO2011/158555
PCT Pub. Date: Dec. 22, 2011

(65) Prior Publication Data
US 2013/0070165 A1 Mar. 21, 2013

(30) Foreign Application Priority Data
Jun. 15, 2010 (JP) .................. 2010-136140

(51) Int. Cl.
*G02B 6/00* (2006.01)
*F21V 8/00* (2006.01)
(Continued)

(52) U.S. Cl.
CPC ........ *G02B 6/0091* (2013.01); *G02F 1/133603* (2013.01); *G02F 1/133605* (2013.01); *H04N 7/00* (2013.01); *G02F 1/133608* (2013.01);
(Continued)

(58) Field of Classification Search
CPC ............ G02B 6/0091; G02F 1/133553; G02F 1/133603; G02F 1/133605; G02F 1/133608; G02F 2001/133613; H04N 5/64

USPC .................................... 362/97.1–97.3
See application file for complete search history.

(56) References Cited

U.S. PATENT DOCUMENTS 7,033,061 B1* 4/2006 Wu ........................ F21V 5/00
359/599
7,455,441 B2* 11/2008 Chosa et al. ................. 362/608
(Continued)

FOREIGN PATENT DOCUMENTS

JP  2006-120644 A  5/2006
JP  2006-267991 A  10/2006
(Continued)

OTHER PUBLICATIONS

Official Communication issued in International Patent Application No. PCT/JP2011/059796, mailed on Jun. 14, 2011.

*Primary Examiner* — Sharon Payne
(74) *Attorney, Agent, or Firm* — Keating & Bennett, LLP

(57) ABSTRACT

An object of the present invention is to suppress the brightness distribution in the lighting device. The backlight unit 12 according to the present invention includes an LED 17 as a light source with a light intensity distribution in which light having a peak light intensity travels in a direction inclined with respect to a front direction, a chassis 14 having an opening on a light exit side and housing the LED 17, and a light leading member 22 provided to extend from a mounting surface of the LED 17 toward the light exit side. The light leading member 22 is configured to lead light from the LED 17 toward the light exit side. The employment of the LED 17 with the above light intensity distribution enables an irradiation area A irradiated with the light having the peak light intensity to be larger. This reduces the uneven that may occur in the brightness distribution of the outgoing light.

18 Claims, 29 Drawing Sheets

(51) Int. Cl.
*H04N 7/00* (2011.01)
*G02F 1/1335* (2006.01)
*H04N 5/64* (2006.01)

(52) U.S. Cl.
CPC ...... *G02F 2001/133613* (2013.01); *H04N 5/64* (2013.01)

(56) References Cited

U.S. PATENT DOCUMENTS

| | | | |
|---|---|---|---|
| 7,854,525 B2 * | 12/2010 | Suzuki et al. | 362/97.2 |
| 7,858,408 B2 * | 12/2010 | Mueller et al. | 438/27 |
| 8,272,771 B2 * | 9/2012 | Arai | 362/608 |
| 8,287,149 B2 * | 10/2012 | Hamada | 362/249.02 |
| 8,421,952 B2 * | 4/2013 | Harbers | G02F 1/133605 349/113 |
| 2005/0001537 A1 * | 1/2005 | West | G02F 1/133603 313/500 |
| 2006/0087827 A1 | 4/2006 | Jung et al. | |
| 2006/0215075 A1 | 9/2006 | Huang et al. | |
| 2006/0220046 A1 * | 10/2006 | Yu et al. | 257/98 |
| 2007/0147075 A1 | 6/2007 | Bang | |
| 2009/0067158 A1 * | 3/2009 | Hamada | 362/97.3 |
| 2009/0109686 A1 * | 4/2009 | Cheng et al. | 362/307 |
| 2010/0046217 A1 * | 2/2010 | Ngai | 362/235 |
| 2010/0073928 A1 * | 3/2010 | Kim | F21V 5/04 362/245 |
| 2010/0109034 A1 * | 5/2010 | Bierhuizen | B29C 45/1671 257/98 |
| 2010/0165619 A1 | 7/2010 | Kawato et al. | |
| 2010/0259706 A1 * | 10/2010 | Kuwaharada | F21V 5/04 349/62 |
| 2011/0063850 A1 * | 3/2011 | Oide et al. | 362/296.01 |

FOREIGN PATENT DOCUMENTS

| | | |
|---|---|---|
| JP | 2007-178988 A | 7/2007 |
| JP | 2008-270144 A | 11/2008 |
| JP | 2010-092672 A | 4/2010 |
| WO | 2006/137459 A1 | 12/2006 |

* cited by examiner

FIG.1
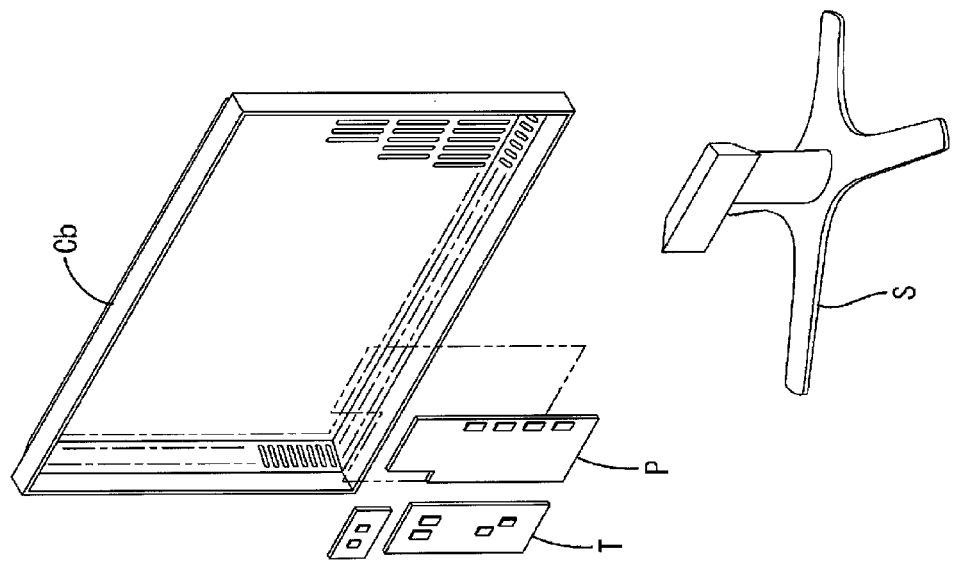
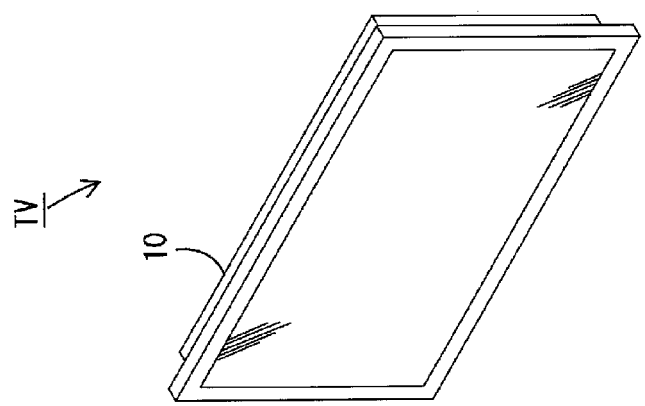
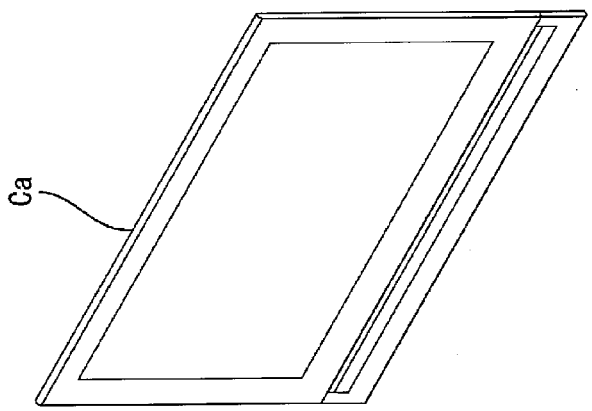

LIGHTING DEVICE, DISPLAY DEVICE AND TELEVISION DEVICE

TECHNICAL FIELD

The present invention relates to a lighting device, a display device, and a television device.

BACKGROUND ART

A liquid crystal panel used for a liquid crystal display device such as a liquid crystal television does not emit light, and thus a backlight unit is required as a separate lighting device. The backlight unit is provided behind the liquid crystal panel (on a side opposite to a display surface). The backlight unit includes a chassis, a light source, an optical member (a diffuser sheet or the like), and a reflection sheet. The chassis has an opening on a side of the liquid crystal panel. The light source is housed in the chassis. The optical member is provided over the opening of the chassis for efficiently introducing light emitted from the light source toward the liquid crystal panel. The reflection sheet faces the optical member and is configured to reflect the light toward the opening of the chassis. An LED may be used as the light source of the backlight unit. In such a case, the chassis houses an LED board on which the LED is mounted.

One example of the backlight unit including the LED as the light source is disclosed in Patent Document 1.

RELATED ART DOCUMENT

Patent Document

Patent Document 1: Japanese Unexamined Patent Publication No. 2006-120644

Problem to be Solved by the Invention

In order to reduce thickness of the above liquid crystal display device including the LED board, a distance between the optical member and the LEDs needs to be reduced. However, if the optical member is located closer to the LEDs, the optical member is irradiated with light emitted from the LEDs before the light is sufficiently diffused. Accordingly, there is a large difference in brightness between an area where the LEDs are arranged and an area where no LEDs are arranged, and thus uneven brightness may occur in outgoing light from the optical member. Further, the number of LEDs may be reduced in order to reduce the power consumption and the production cost of the liquid crystal display device. In such a case, an interval between the LEDs adjacent to each other increases. Accordingly, there is a large difference in brightness between the arrangement area of LEDs and the non-arrangement area of LEDs, and thus uneven brightness may occur.

DISCLOSURE OF THE PRESENT INVENTION

The present invention was made in view of the above circumstances. It is an object of the present invention to suppress uneven brightness.

Means for Solving the Problem

A lighting device according to the present invention includes a light source with a light intensity distribution in which light having a peak light intensity travels in a direction inclined with respect to a front direction, a chassis housing the light source on a mounting surface and having an opening on a light exit side of the lighting device, and a light leading member provided to extend from the mounting surface toward the light exit side. The light leading member is configured to lead light from the light source toward the light exit side.

The above lighting device includes the light source having the light intensity distribution in which the light having the peak light intensity travels in a direction inclined with respect to the front direction. Compared with the light source having the light intensity distribution in which light having a peak light intensity travels in the front direction, the light source having the above configuration can have a relatively large irradiation area irradiated with the light having the peak light intensity. Thus, unevenness in the brightness distribution is less likely to occur.

The light emitted from the light source tends to be more efficiently used as outgoing light as an angle of the light emitted from the light source with respect to the front direction decreases and tends to be less efficiently used as the outgoing light as the angle of the light emitted from the light source with respect to the front direction increases. Contrary to the above, the irradiation area of the light having the peak light intensity tends to be larger as the angle of the light having the peak light intensity with respect to the front direction increases, which is preferable for suppression of uneven brightness. Accordingly, if the angle between the light having the peak light intensity and the front direction is increased to suppress the uneven brightness, the light emitted from the light source at a larger angle than the angle between the light having the peak light intensity and the front direction may be less efficiently used as the outgoing light. In such a case, in the irradiation area irradiated with the light having the peak light intensity, the brightness may be insufficient and a dark portion may appear. In addition, the brightness of the outgoing light as a whole may decrease.

The present invention includes the light leading member configured to lead the light toward the light exit side. The light leading member is provided to extend from the mounting surface of the light source toward the light exit side. With this configuration, the light emitted from the light source at a large angle with respect to the front direction can be led by the light leading member toward the front side. Thus, the light can be more efficiently used as the outgoing light. Particularly, since the light emitted at an angle larger than the angle between the light having the peak light intensity and the front direction can be more efficiently used as the outgoing light by the light leading member, the irradiation area irradiated with the light having the peak light intensity is less likely to be recognized as the dark portion and the uneven brightness is less likely to occur. In addition, the brightness of the outgoing light as a whole can be improved.

If the uneven brightness is less likely to occur in the outgoing light as above, the thickness of the lighting device can be reduced, for example. In addition, the number of light sources can be reduced, and thus the power consumption and the production cost of the lighting device can be reduced.

The term "front direction" used herein can be defined as "a normal direction with respect to the light exit surface of the lighting device."

The following configurations are preferable as aspects of the present invention.

(1) The light leading member may be inclined with respect to the front direction, and the light leading member may include a light leading surface facing the light source. With this configuration, the light can change its angle with respect to the front direction depending on the angle between the light leading surface and the front direction. Thus, the light emitted from the light source at a large angle with respect to the front direction can be efficiently led and efficiently used as the outgoing light. This configuration is more preferable for suppression of uneven brightness and improvement of brightness.

(2) The light leading surface may be located on a side opposite to the light exit side with respect to an optical path of the light having the peak light intensity, whereby the light leading surface does not overlap with the optical path. With this configuration, the light having the peak light intensity can exit without reaching the light leading surface almost at all. If the light having the peak light intensity is led by the light leading surface, the irradiation area irradiated with the light having the peak light intensity decreases, and thus the uneven brightness is more likely to occur. The present invention is free from such a problem. The irradiation area irradiated with the light having the peak light intensity can be sufficiently provided. This configuration is preferable for suppression of uneven brightness.

The term "optical path" used herein can be defined as "a trajectory of light emitted from a light source and traveling without being reflected or refracted by other members."

(3) The light leading member may be inclined such that the light leading surface and the front direction form an angle larger than an angle between the light having the peak light intensity and the front direction. With this configuration, the light can be led by the light leading surface at a wide angle compared with an angle between the light leading surface and the front direction is smaller than the angle between the light leading surface and the front direction. This configuration is more advantageous for suppression of uneven brightness. In addition, the light leading surface does not overlap with the optical path of the light having the peak light intensity, and thus the light having the peak light intensity does not reach the light leading surface.

(4) Each of the angle between the light leading surface and the front direction and the angle between the light having the peak light intensity and the front direction may be in a range from 45 degrees to 90 degrees. In this configuration, the angle between the light having the peak light intensity and the front direction is in the range from 45 degrees to 90 degrees, and thus a sufficiently large irradiation area irradiated with the light having the peak light intensity can be provided. This is preferable for suppression of uneven brightness. In addition, the angle between the light leading surface and the front direction is in the range from 45 degrees to 90 degrees and larger than the angle between the light having the peak light intensity and the front direction. With this configuration, the light having a larger angle with respect to the front direction than the light having the peak light intensity can be more efficiently used. This is more preferable for suppression of uneven brightness and improvement of brightness.

(5) Each of the angle between the light leading surface and the front direction and the angle between the light having the peak light intensity and the front direction is in a range from 60 degrees to 80 degrees. With this configuration, the irradiation area irradiated with the light having the peak light intensity can be larger. In addition, the light having a larger angle with respect to the front direction than the light having the peak light intensity can be more efficiently used. This is more preferable for suppression of uneven brightness and improvement of brightness.

(6) The light source may include a plurality of light sources and the light sources may be arranged in a plane in the chassis. In addition, the light leading member may include a plurality of light leading members and each of the light leading members may separately surround each of the light sources. With this configuration, the light emitted from each light source can be separately led by each light leading member. This is preferable for suppression of uneven brightness and improvement of brightness. In addition, this expands the possibility of arrangement of the light sources in a plane in the chassis.

(7) The light sources may be arranged at regular intervals. With this configuration, the distribution density of the light sources in the chassis can be equalized. This is more preferable for suppression of uneven brightness.

(8) The light source may include a plurality of light sources and the light sources may be arranged in a plane such that the light sources are grouped into light source groups. In addition, the light leading member may include a plurality of light leading members and each of the light leading members may separately surround each of the light source groups. With this configuration, the number of light leading members can be reduced, and thus the cost can be reduced. In this configuration, the light emitted from the light source group including the light sources can be separately led by each light leading member, and thus the uneven brightness can be suppressed and the brightness can be improved.

(9) The light source groups may be arranged at an interval larger than an interval between the light sources adjacent to each other included in each of the light source groups. With this configuration, each light leading member separately surrounding each of the light source groups can be sufficiently large. This allows the light leading member to sufficiently exhibit its light leading function, and thus this is preferable for suppression of uneven brightness and improvement of brightness.

(10) At least two of the light sources may be arranged in a direction along one side of the chassis and at least two of the light sources may be arranged in a direction along another side of the chassis perpendicular to the one side, and the light source groups each may include at least four of the light sources arranged in the directions along the one side and the another side of the chassis. With this configuration, the light emitted from the light sources arranged in the directions along the one side and the another side perpendicular to the one side of the chassis can be efficiently led by the light leading member, which is preferable for suppression of uneven brightness and improvement of brightness.

(11) The light sources may be linearly arranged in a direction along one side of the chassis. The light source groups each may include the light sources linearly arranged. In addition, the light leading member may extend along an arrangement direction in which the light sources included in each of the light source groups are arranged. With this configuration, the light emitted from each of the light sources linearly arranged in the direction along the one side of the chassis can be efficiently led by the light leading member extending along the arrangement direction in which the light sources included in each of the light source groups are arranged. This is preferable for suppression of uneven brightness and improvement of brightness.

(12) The light leading member may have a circular circumferential cross-section. With this configuration, the light radiating from the light source can be led toward the light exit side without having particular directivity. This is preferable for suppression of uneven brightness and improvement of brightness.

(13) The light leading member may have a rectangular circumferential cross-section. With this configuration, the shape of the light leading member can be stabilized, for example.

(14) The light leading surface may be an inclined surface in a cross section of the light leading member taken along the front direction. With this configuration, the light can be properly angled by the light leading surface that is the inclined surface in the cross section of the light leading member taken along the front direction. This is preferable for suppression of uneven brightness and improvement of brightness.

(15) The light leading surface may be an arc-like curved surface in a cross section of the light leading member taken along the front direction. With this configuration, the light can be properly angled by the light leading surface that is the arc-like curved surface in the cross section of the light leading member taken along the front direction.

(16) The light leading member may extend further to the light exit side than the light source does. With this configuration, the light leading member can lead more light toward the light exit side compared with a light leading member extending to the same height as the light source. This is more preferable for suppression of uneven brightness and improvement of brightness.

(17) The lighting device may further include a reflector arranged to cover a surface of the chassis on the light exit side. The light leading member may be integrally formed with the reflector. With this configuration, the light in the chassis may be reflected by the reflector, and thus the light can be more efficiently led toward the light exit side. In addition, since the light leading member is integrally formed with the reflector, the light leading members can be easily arranged in the chassis, for example.

(18) The reflector may be formed of a thermoplastic resin. With this configuration, the light leading member can be readily formed by vacuum forming, for example. In addition, the shape of the light leading member can be stabilized. Particularly, this configuration is advantageous when the light leading members are formed on the reflector or the light leading member has a complex shape.

(19) The reflector may have a white surface. With this configuration, high light reflectivity can be obtained, and thus the light can be more efficiently led toward the light exit side. This is more preferable for suppression of uneven brightness and improvement of brightness.

(20) The light source may be a point light source, and the point light source may have a light intensity distribution in which the light having the peak light intensity radiates therefrom. With this configuration, the irradiation area irradiated with the light having the peak light intensity has an annular shape. This is more preferable for suppression of uneven brightness.

(21) The light source may include a light emitting portion having a light emitting surface and a lens arranged to face the light emitting surface. The light emitting portion may be configured to emit light and the lens may be configured to diffuse and output the light emitted from the light emitting portion. With this configuration, the lens can diffuse and output the light emitted from the light emitting portion, and thus the light intensity distribution in which the light having the peak light intensity travels in the direction inclined with respect to the front direction can be readily designed.

(22) The lens may include a recess on a surface on the light exit side. With this configuration, the light emitted from the light emitting portion can be properly refracted and diffused in a suitable manner depending on the shape of the recess, and thus the optical design of the lens can be readily made.

(23) The lens is integrally provided with the light emitting portion. With this configuration, since the lens and the light emitting portion included in the light source is one component, compared with the case that the lens is a separate component than the light emitting portion, the number of components can be reduced and the production cost of the light source can be reduced.

(24) The lens may be a separate member from the light emitting portion. With this configuration, a lighting source including the light emitting portion and the lens as separate components can be used.

(25) The light emitting portion may include an LED element. With this configuration, brightness can be improved and power consumption can be reduced.

(26) The lighting device may further include an optical member arranged on the light exit side so as to face the light source. The light leading member may be arranged such that a clearance is provided between the light leading member and the optical member. If there is no clearance between the light leading member and the optical member and the light leading member is in contact with the optical member, the light leading member in contact with the optical member may be recognized as a dark portion. In the above configuration, however, there is the clearance between the light leading member and the optical member, and thus the light leading member is less likely to be recognized as a dark portion. This is preferable for suppression of uneven brightness.

(27) The lighting device may further include a light source board including the mounting surface. The light source board is housed in the chassis. The light source may include a plurality of light sources and the light sources may be mounted on the mounting surface of the light source board. With this configuration, the light sources can be collectively arranged in the chassis by locating the light source board in the chassis. This facilitates the mounting operation.

Next, to solve the above problem, a display device according to the present invention includes the above-described lighting device and a display panel configured to provide display using light from the lighting device.

In such a display device, the lighting device supplying light to the display panel can suppress the unevenness brightness. Thus, high quality display can be achieved.

The display panel may be a liquid crystal panel. The display device as a liquid crystal display device has a variety of applications, such as a television display or a personal-computer display. Particularly, it is suitable for a large screen display.

Advantageous Effect of the Invention

According to the technology of the present invention, the uneven brightness is less likely to occur.

BRIEF DESCRIPTION OF THE DRAWINGS

FIG. 1 is an exploded perspective view of a general construction of a television device according to the first embodiment of the present invention;

MODE FOR CARRYING OUT THE INVENTION

First Embodiment

The first embodiment of the present invention will be described with reference to FIG. 1 to FIG. 9. In the present embodiment, a liquid crystal display device 10 will be described. An X-axis, a Y-axis, and a Z-axis are described in a part of the drawings, and a direction of each axial direction corresponds to a direction described in each drawing. An upper side in FIG. 4 and FIG. 5 corresponds to a front-surface side and a lower side in FIG. 4 and FIG. 5 corresponds to a rear-surface side.

Figure 2:
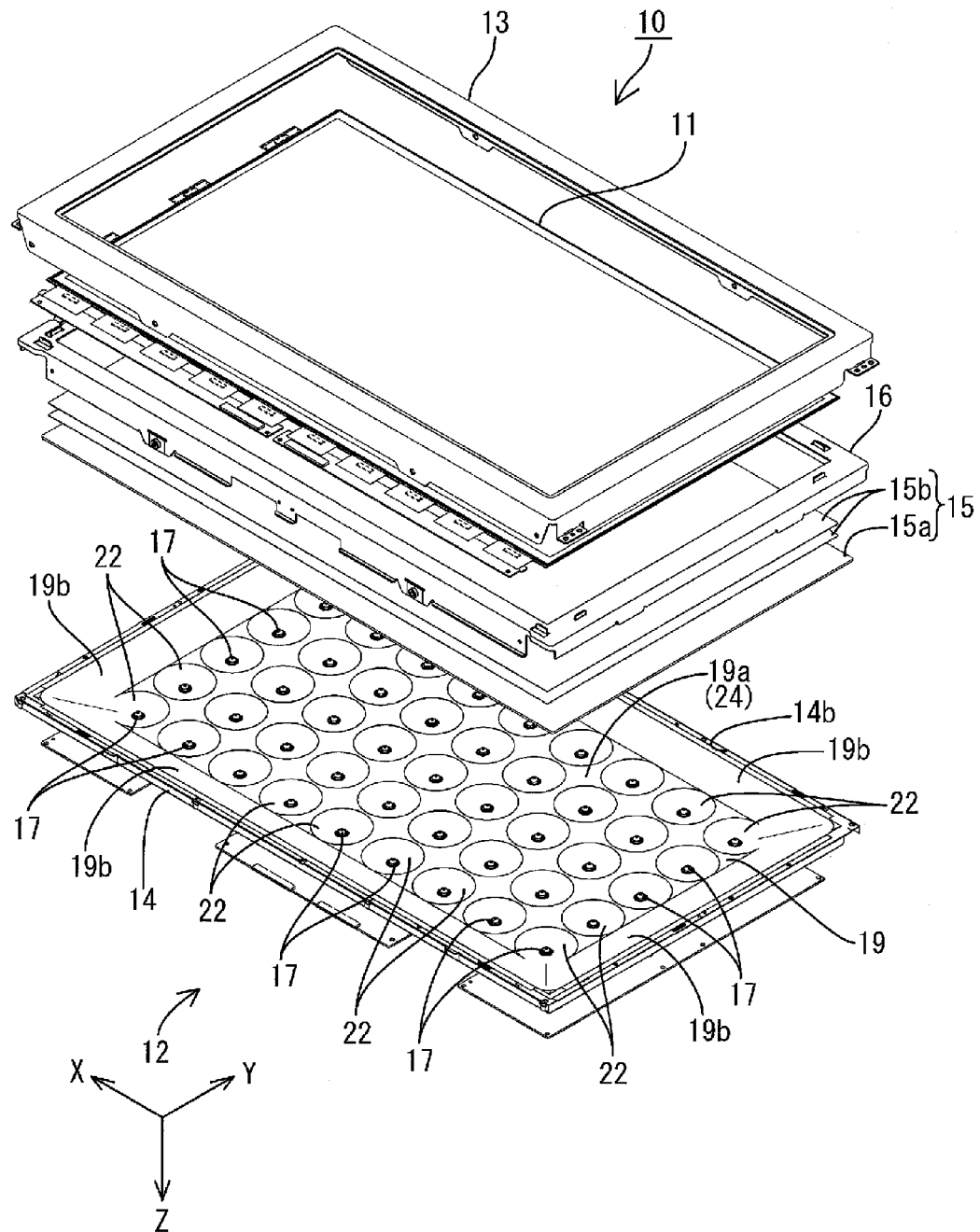
FIG. 2 is an exploded perspective view illustrating a general configuration of a liquid crystal display device included in the television device.

As illustrated in FIG. 1, the television device TV of the present embodiment includes the liquid crystal display device 10, front and rear cabinets Ca, Cb which house the liquid crystal display device 10 therebetween, a power source P, a tuner T, and a stand S. The entire shape of the liquid crystal display device (a display device) 10 is a landscape (elongated) rectangular (square) shape. The liquid crystal display device 10 is housed in a vertical position. As illustrated in FIG. 2, the liquid crystal display device 10 includes a liquid crystal panel 11 as a display panel, and a backlight device (a lighting device) 12 as an external light source. The liquid crystal panel 11 and the backlight device 12 are collectively held by a frame shaped bezel 13 and the like.

Next, the liquid crystal panel 11 and the backlight unit 12 included in the liquid crystal display device 10 will be described in sequence. The liquid crystal panel (a display panel) 11 has a landscape rectangular shape in a plan view. The liquid crystal panel 11 is configured such that a pair of glass substrates is bonded together with a predetermined gap therebetween and liquid crystal is sealed between the glass substrates. On one of the glass substrates, switching components (for example, TFTs) connected to source lines and gate lines which are perpendicular to each other, pixel electrodes connected to the switching components, an alignment film, and the like are provided. On the other glass substrate, color filters having color sections such as red (R), green (G), and blue (B) color sections arranged in a predetermined pattern, counter electrodes, an alignment film, and the like are provided. Polarizing plates are arranged on outer surfaces of the substrates.

The backlight unit 12 will be described in detail. As illustrated in FIG. 2, the backlight unit 12 includes a chassis 14, an optical member set 15 (a diffuser plate (a light diffusing member) 15a, optical sheets 15b arranged between the diffuser plate 15a and the liquid crystal panel 11), and a frame 16. The chassis 14 has a box-like shape and has an opening 14b on the light exit side (the liquid crystal panel 11 side). The optical member set 15 is provided so as to cover the opening 14b of the chassis 14. The frame 16 provided along an outer edge of the chassis 14 holds an outer edge of the optical sheet set 15 such that the outer edge is sandwiched between the frame 16 and the chassis 14. The chassis 14 houses LEDs (Light Emitting Diode) 17 as light sources, an LED board 18 on which the LEDs 17 are mounted, a reflection sheet 19 reflecting the light in the chassis 14 toward the optical member 15 side, and an LED board holder 20 (a light source board holder) holding the LED board 18 in the chassis 14. As above, the backlight unit 12 according to the present embodiment is a direct-type backlight unit. In the backlight unit 12, the optical member 15 is arranged to face a light exit side of the LED 17. Hereinafter, each component of the backlight unit 12 will be described in detail.

Figure 3:
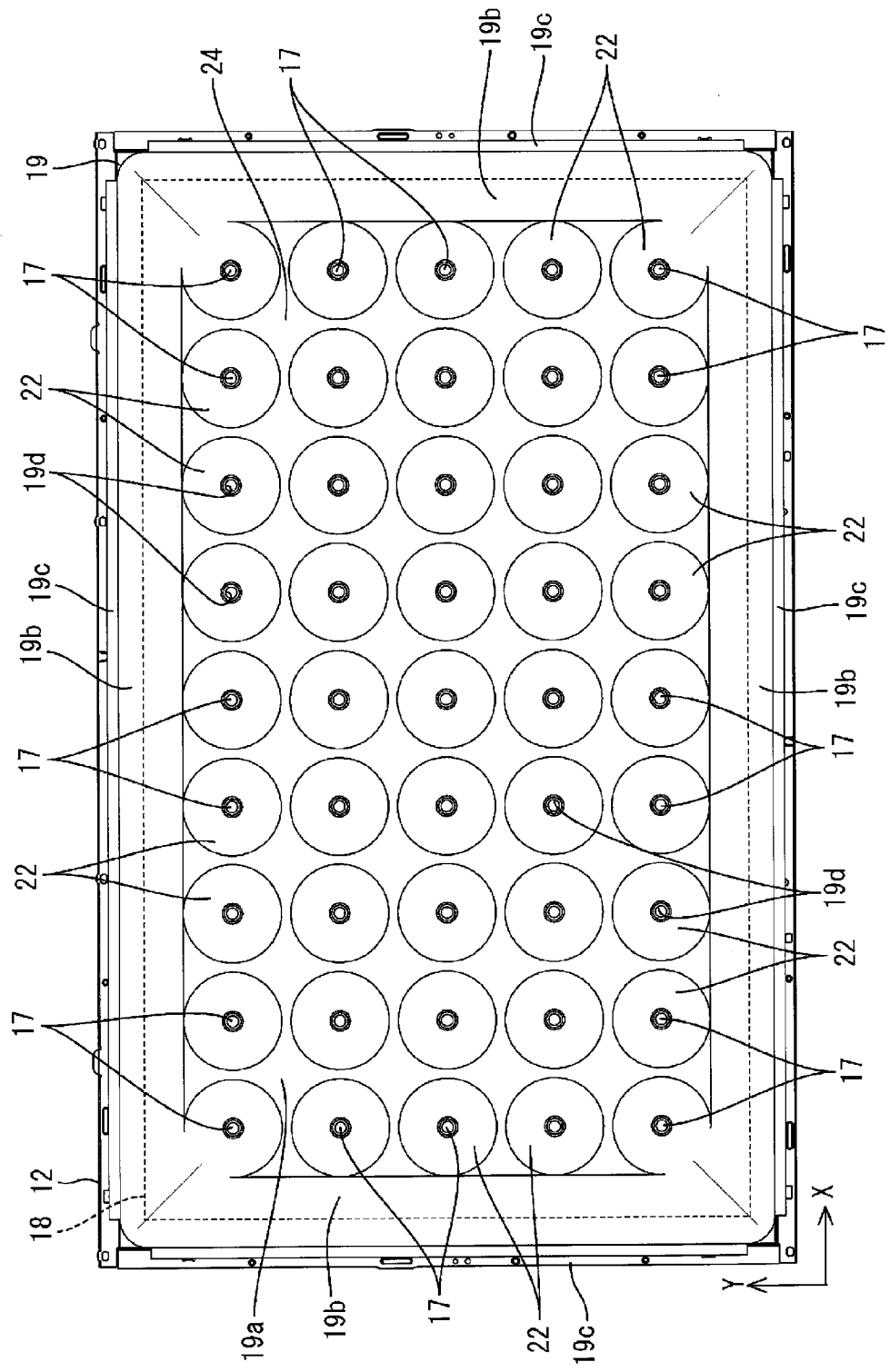
FIG. 3 is a plan view illustrating an arrangement of an LED board and a reflection sheet in a chassis included in the liquid crystal display device.
Figure 4:
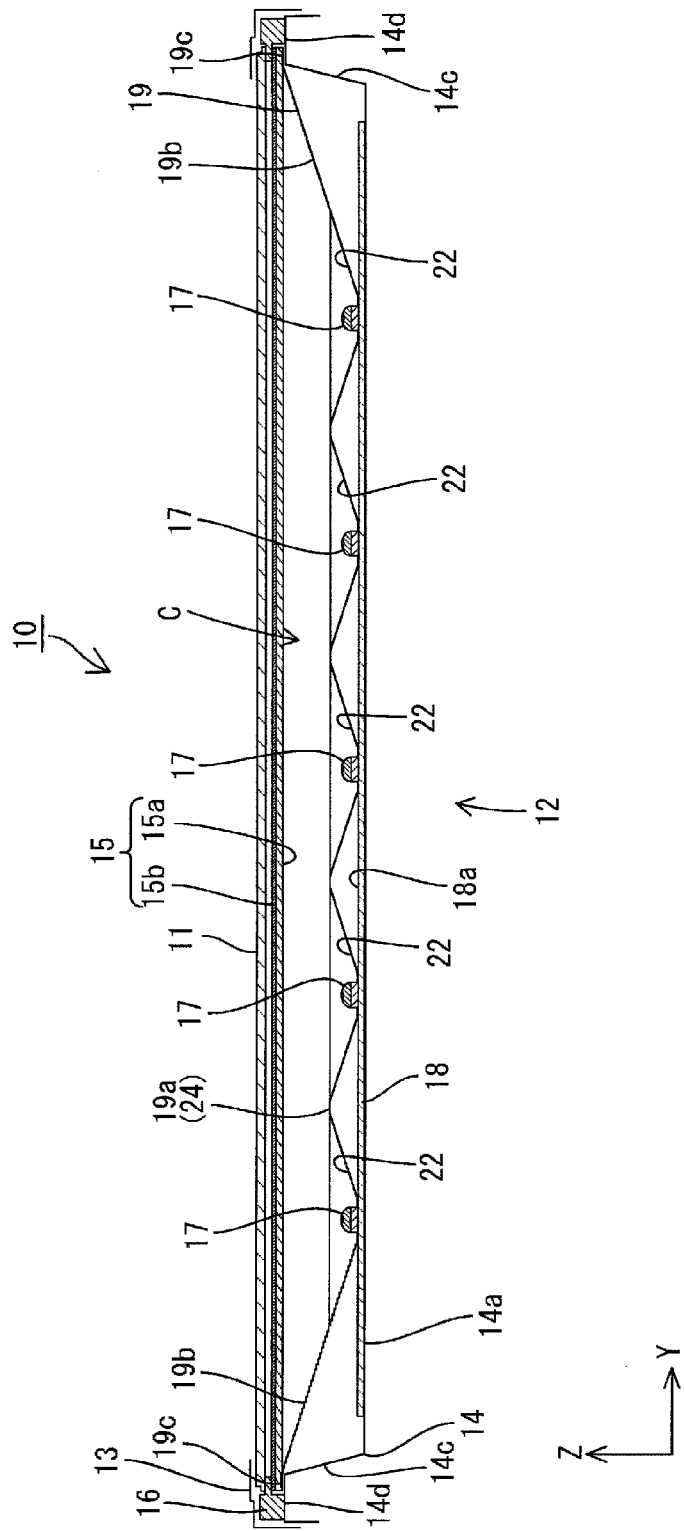
FIG. 4 is a cross-sectional view of the liquid crystal display device taken along a short-side direction thereof.
Figure 5:
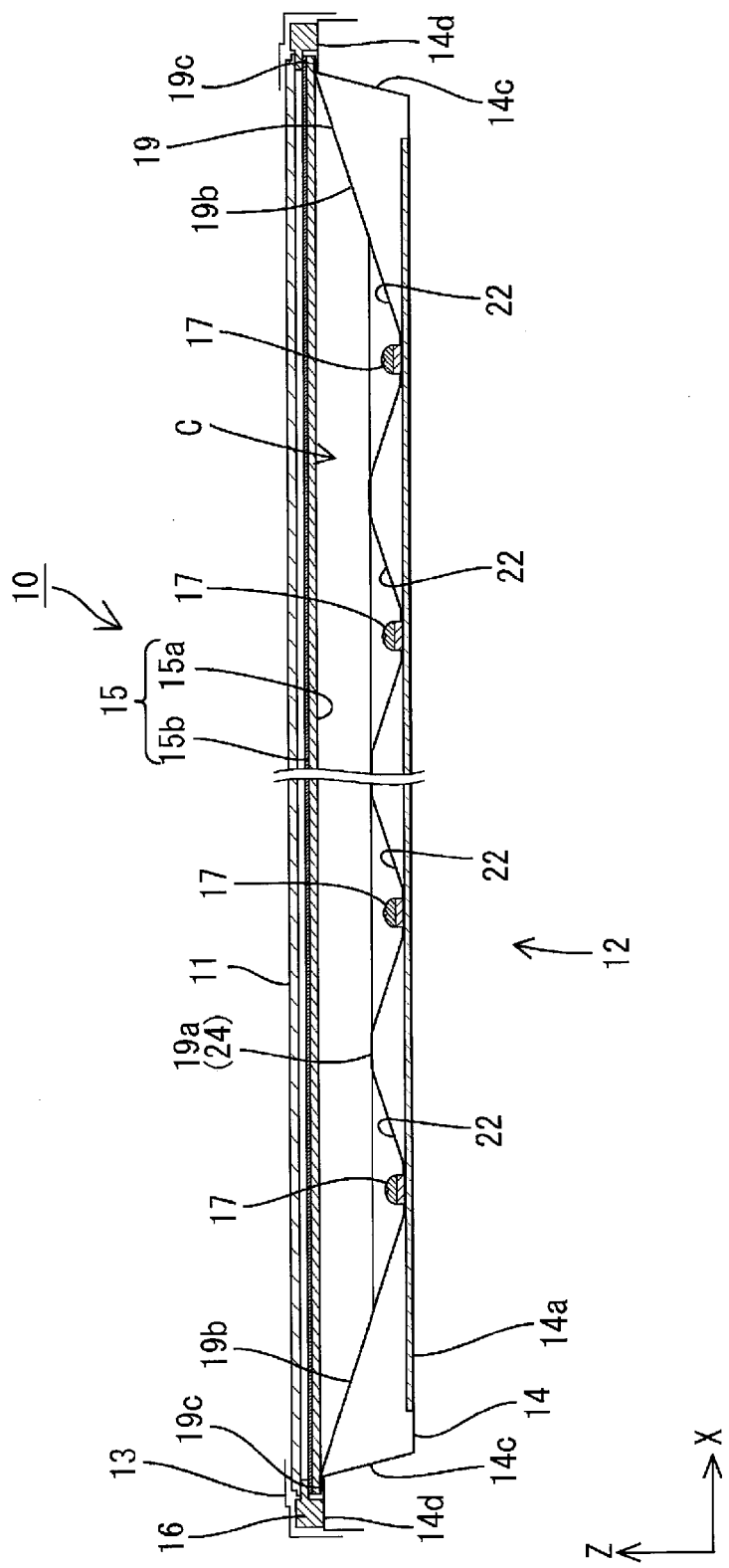
FIG. 5 is a cross-sectional view of the liquid crystal display device taken along a long-side direction thereof.

The chassis 14 is made of metal. As illustrated in FIG. 3 to FIG. 5, the chassis 14 includes a bottom plate 14a having a landscape rectangular shape (square, elongated shape) like the liquid crystal panel 11, and side plates 14c each rising from an outer edge of long sides and short sides of the bottom plate 14a toward the front surface side (the light exit side), and receiving plates 14d extend outwardly from upper edges of the side plates 14c. The chassis 14 has a shallow box-like shape (shallow plate shape) opened to the front surface side as a whole. The long-side direction of the chassis 14 matches the X-axis direction (a horizontal direction), and the short-side direction of the chassis 14 matches the Y-axis direction (a vertical direction). The bottom plate 14a of the chassis 14 is arranged on a rear side of the LED board 18, i.e., on a side opposite to the light exit side of the LED 17. On each receiving plate 14d of the chassis 14, the frame 16 and the optical member 15 which will be described later can be placed from the front surface side. The frame 16 is fixed to the receiving plates 14d with screws.

As illustrated in FIG. 2, the optical member 15 has a landscape rectangular shape in a plan view like the liquid crystal panel 11 and the chassis 14. As illustrated in FIG. 4 and FIG. 5, outer edge portions of the optical member 15 are placed on the receiving plates 14d so that the opening 14b of the chassis 14 is covered with the optical member 15 and the optical member 15 is arranged between the liquid crystal panel 11 and the LEDs 17. The optical member 15 is arranged on the front side of the LEDs 17 such that the optical member 15 faces the LEDs 17 with a predetermined distance therebetween. The optical member 15 includes the diffuser plate 15a provided on the rear side (the LED 17 side, a side opposite to the light exit side) and the optical sheets 15b provided on the front side (the liquid crystal panel 11 side, the light exit side). The diffuser plate 15a is formed by dispersing light diffusing particles in a substantially transparent resin base member having a predetermined thickness. The diffuser plate 15a diffuses the light transmitting therethrough. Each optical sheet 15b has a sheet-like shape that is thinner than the diffuser plate 15a. The optical sheets 15b and the diffuser plate 15a are laminated on each other. Specific examples of the optical sheets 15b include a diffuser sheet, a lens sheet, and a reflection-type polarizing sheet, and any of them may be suitably selected to be used.

As illustrated in FIG. 2, the frame 16 has a frame shape extending along the outer edge portions of the liquid crystal panel 11 and the optical member 15. The outer edge portion of the optical member 15 can be sandwiched between the frame 16 and each receiving plate 14d (FIG. 4 and FIG. 5). The frame 16 can receive the rear surface of the edge portion of the liquid crystal panel 11, and thus the edge portion of the liquid crystal panel 11 can be sandwiched between the frame 16 and the bezel 13 arranged on the front side (FIG. 4 and FIG. 5).

Next, the LEDs 17 and the LED board 18 on which the LEDs 17 are mounted will be explained. The LEDs 17 are point light sources which appear as points on a light exit surface of the backlight unit 12. The LEDs 17 are mounted on a front surface of the LED board 18. A surface of each LED 17 opposite to the surface contacted with the front surface of the LED board 18 (a surface facing the optical member 15) is a light emitting surface. The LED 17 will be described in detail later.

As illustrated in FIG. 3 and FIG. 5, similar to the bottom plate 14a of the chassis 14, the LED board 18 has a landscape rectangular shape (square, elongated shape). The LED board 18 is housed in the chassis 14 such that the long-side direction of the LED board 18 matches the X-axis direction and the short-side direction thereof matches the Y-axis direction. The LED board 18 has a plate shape extending along the bottom plate 14a and is arranged on the front surface of the bottom plate 14a. The LED board 18 has a size enough to cover substantially the entire area of the bottom plate 14a. Specifically, the LED board 18 has a size that can cover almost all area of the bottom plate 14a except an outer peripheral portion of the bottom plate 14a, i.e., a middle portion of the bottom plate 14a. On a main surface of the LED board 18 facing toward the front side (a surface on a light exit side, a surface facing the optical member 15), the LEDs 17 having the above-described configuration are mounted. This main surface is a mounting surface (arrangement surface) 18a of the LEDs 17. As illustrated in FIG. 3, the LEDs 17 are arranged on the LED board 18 in the X-axis direction (the long-side direction of the chassis 14 and the LED board 18) and the Y-axis direction (the short-side direction of the chassis 14 and the LED board 18). The LEDs 17 are arranged in a plane (two dimensional arrangements) so as to be in parallel with each other. In other words, the LEDs 17 are arranged in rows and columns (in a matrix) on the LED board 18, in which the row direction corresponds to the X-axis direction and the column direction corresponds to the Y-axis direction. Specifically, on the LED board 18, nine LEDs 17 are arranged in the X-axis direction and five LEDs 17 are arranged in the Y-axis direction. The LEDs 17 are connected to each other via a wiring pattern on the LED board 18. An arrangement pitch of the LEDs 17 (an interval between adjacent LEDs 17) arranged in the X-axis direction is constant. Similarly, an arrangement pitch of the LEDs 17 arranged in the Y-axis direction is constant. Further, the arrangement pitch in the X-axis direction and the arrangement pitch in the Y-axis direction are substantially the same. Accordingly, the LEDs 17 are arranged on the LED board 18 at substantially regular intervals in the X-axis direction and the Y-axis direction.

The reflection sheet 19 is made from a thermoplastic synthetic resin. The reflection sheet 19 has a white surface that provides high light reflectivity. As illustrated in FIG. 3 to FIG. 5, the reflection sheet 19 has a size enough to cover substantially the entire area of an inner surface (a surface on a light exit side) of the chassis 14, and thus a front surface (a surface on the light exit side, a surface on the optical member 15 side) of the LED board 18 arranged in the chassis 14 can be covered. The reflection sheet 19 can reflect the light in the chassis 14 toward the front side (the light exit side, the optical member 15 side). The reflection sheet 19 includes a bottom portion 19a, four rising portions 19b, and extended portions 19c. The bottom portion 19a extends along the LED board 18 (the bottom plate 14a) and has a size that can cover substantially the entire area of the LED board 18. The rising portions 19b each rise from an outer edge of the bottom portion 19a toward the front side at an angle to the bottom plate 14a of the chassis 14. The extended portions 19c each extend outwardly from an outer edge of each rising portion 19b so as to be placed on a receiving plate 14d of the chassis 14. The bottom portion 19a of the reflection sheet 19 is arranged on the front surface of the LED board 18, that is, the mounting surface of the LEDs 17.

The bottom portion 19a of the reflection sheet 19 includes through holes 19d for light sources at positions corresponding to the LEDs 17. The LEDs 17 are passed through the corresponding through holes 19d. The light source through holes 19d are arranged in rows and columns (in a matrix) so as to correspond to the arrangement of the LEDs 17.

Figure 7:
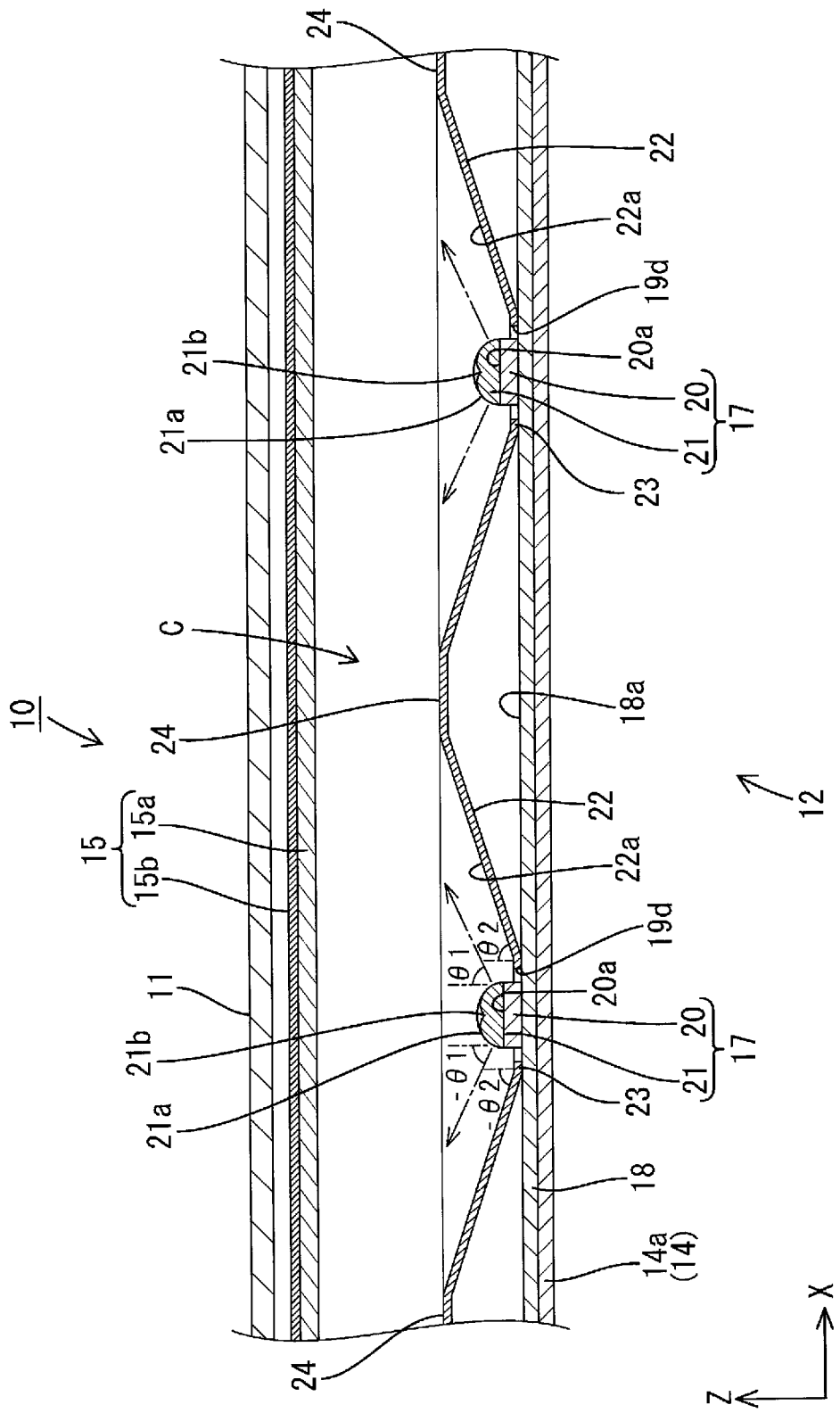
FIG. 7 is a magnified cross-sectional view of a major part illustrating the LEDs and the light leading members of the reflection sheet.

The LED 17 will be explained in detail. As illustrated in FIG. 7, the LED 17 integrally includes a light emitting portion 20 configured to emit light and a lens 21 configured to diffuse and output the light emitted from the light emitting portion 20. The light emitting portion 20 includes an LED chip that is a light emitting source. The lens 21 faces the light emitting surface 20a of the light emitting portion 20. The light emitting portion 20 is configured by sealing the LED chip with a resin material onto a base board that is fixed to the LED board 18 (the base board and the LED chip are not illustrated). The LED chip that is mounted on the base board has one main light emission wavelength, and specifically, the LED chip that emits a single color of blue is used. On the other hand, a fluorescent material is dispersed in the resin material that seals the LED chip therein. The fluorescent material converts blue light emitted from the LED chip into white light. This generally enables the LED 17 to emit white light.

The lens 21 is made of substantially transparent (high light transmissive) synthetic resin (for example, polycarbonate or acrylic). The lens 21 has a refractive index a little bit higher than that of air. The lens 21 is mounted on the light emitting surface 20a of the light emitting portion 20. The lens 21 has a substantially hemispherical shape (dome) that is horizontally long and has a light output surface 21a from which the light is emitted. The light output surface 21a enables the light emitted from the light emitting portion 20 to be radially diffused from the middle of the LED 17. In addition, the light output surface 21a has a recess 21b on substantially the middle of the lens 21. The recess 21a enables the light to be refracted at a wider angle and diffused in a radial direction. As described above, the light emitted from the light emitting portion 20 passes through the lens 21 so that the light is diffused in a radial direction from the middle of the LED 17, and thus the directivity is reduced. Hereinafter, a specific optical design of the lens 21 will be explained.

Figure 8:
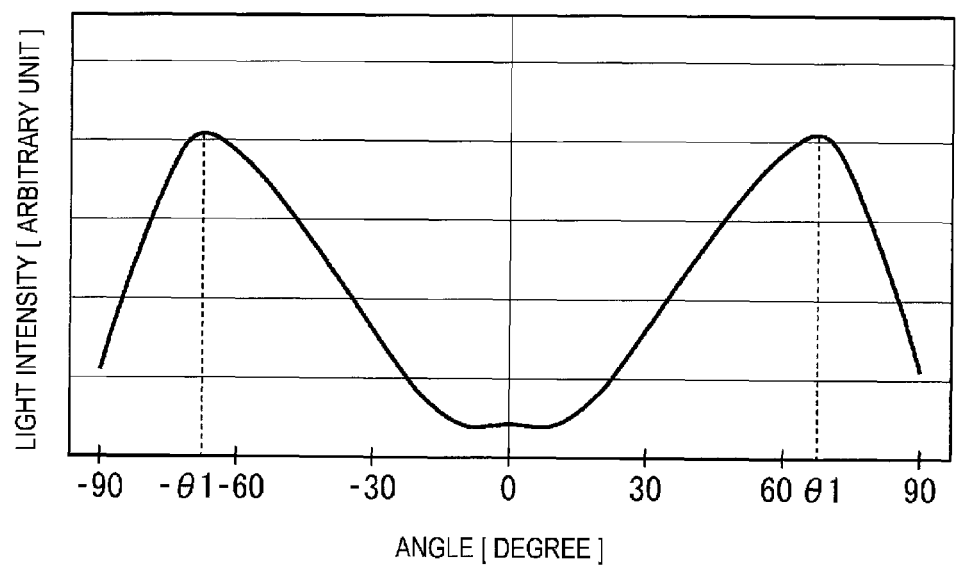
FIG. 8 is a graph indicating a light intensity distribution of the LED.

FIG. 8 indicates a relation between an output angle and a light intensity of the light exiting from the lens 21 (the light emitted from the LED 17), i.e., light intensity distribution (light intensity distribution characteristics) of the LED 17 of the present embodiment. In FIG. 8, angles with respect to the front direction (in units of degree) are plotted on an ordinate and the light intensity (in arbitrary unit) is plotted on an abscissa. The term "front direction" used herein can be defined as a direction extending through the middle of the LED 17 in the Z-axis direction, which is a direction perpendicular to a main plate surface of the optical member 15 (the light exit surface of the backlight unit 12), toward the front side, for example. Specific units of the "light intensity" include radiance (W/sr·m2), radiant flux (W), and irradiance (W/m2). Any other physical quantities relating to quantity of radiation may be employed. Hereinafter, the light intensity distribution of the LED 17 will be described in detail. As indicated in FIG. 8, the LED 17 has the light intensity distribution in which the light having the highest light intensity, i.e., the light having the peak light intensity, is emitted from the LED 17 at an inclination angle θ1 (−θ1), which is not zero, with respect to the front direction. Specifically, the light traveling from the LED 17 in the front direction (the front direction is indicated with 0 degree in FIG. 8) has the lowest light intensity. The light intensity gradually increases as an absolute value of the angle with respect to the front direction increases. Then, the light intensity gradually decreases after the angle exceeds the angle θ1 (−θ1) at which the light has the peak light intensity. The light intensity distribution of the LED 17 is substantially symmetric if there is no manufacturing error. More specifically, the light intensity changes relatively gradually between the angle of 0 degree and the angle θ1 (−θ1) at which the light has the peak light intensity, and the light intensity changes relatively sharply between the angle θ1 (−θ1) at which the light has the peak light intensity and the angle of 90 degrees (−90 degrees).

Figure 9:
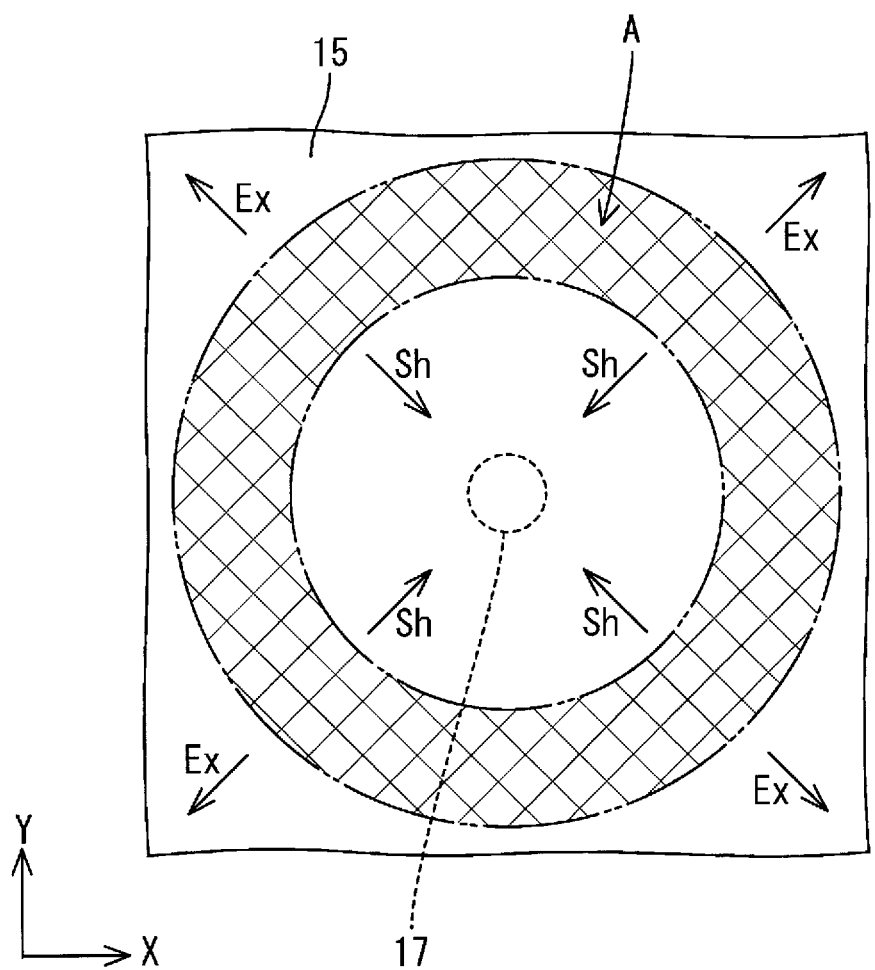
FIG. 9 is a plan view schematically illustrating an irradiation area of an optical member irradiated with the light having the peak light intensity.

The light having the peak light intensity radiates from the middle of the LED 17 and travels in the front direction at a predetermined angle θ1 (−θ1). Thus, as illustrated in FIG. 9, an irradiation area A of the optical member irradiated with the light having the peak light intensity has a doughnut shape (an annular shape) having a predetermined width. For ease of illustration, in FIG. 9, the irradiation area A is a hatched area defined by two circles indicated by two two-dotted chain lines. The irradiation area A tends to decrease in a direction indicated by an arrow Sh in FIG. 9, i.e., in a direction toward the middle of the irradiation area A, as the absolute value of the angle θ1 (−θ1) between the light having the peak light intensity and the front direction decreases. On the other hand, the irradiation area A tends to increase in a direction indicated by an arrow Ex in FIG. 9, i.e., in a direction away from the middle of the irradiation area A, as the absolute value of the angle θ1 (−θ1) between the light having the peak light intensity and the front direction increases. Hereinafter, the size of the angle is based on "the absolute value of the angle" unless otherwise specified. Namely, the irradiation area A irradiated with the light having the peak light intensity increases as the angle θ1 (−θ1) between the light having the peak light intensity and the front direction increases. This is advantageous for suppression of unevenness brightness in the distribution of the light exiting from the optical member 15. In the present embodiment, the absolute value of the angle θ1 (−θ1) between the light having the peak light intensity and the front direction is in a range from 45 degrees to 90 degrees, preferably in a range from 60 degrees to 80 degrees, more preferably about 70 degrees as indicated in FIG. 8.

The light emitted from the LED 17 tends to be applied to the main surface of the optical member 15 at a sharper angle, which is substantially perpendicular to the main plate surface of the optical member 15, as the angle between the light and the front direction decreases (normal direction with respect to the main plate surface of the optical member 15). Accordingly, the light use efficiency as the outgoing light which is based on the amount of light traveling in the front direction is improved, and thus the brightness is improved. On the other hand, the light emitted from the LED 17 tends to be applied to the main surface of the optical member 15 at a shallow angle, which is an angle nearly zero degree with respect to the main plate surface of the optical member 15, as the angle between the light and the front direction increase. Accordingly, the light use efficiency as the outgoing light is deteriorated, and thus the brightness is reduced. Accordingly, in order to suppress uneven brightness, if the absolute value of the angle θ1 (−θ1) between the light having the peak light intensity and the front direction is set at about 70 degrees, which is relatively large, the light emitted at a larger angle with respect to the front direction than the light having the peak light intensity (the light having the absolute value of the angle of 70 degrees or more) is applied to the main plate surface of the optical member 15 at an extremely shallow angle (for example, the absolute value of the angle of 20 degrees or less). This may deteriorate the light use efficiency as the outgoing light. In such a case, the brightness may be insufficient in an irradiation area of the optical member 15 irradiated with the light having a larger angle with respect to the front direction than the light having the peak light intensity. Accordingly, the brightness difference between such an irradiation area and the irradiation area A irradiated with the light having the peak light intensity (the area A having the highest brightness in the irradiation area of the optical member 15 irradiated with the LED 17) increases. This brightness difference may be recognized as the uneven brightness.

As illustrated in FIG. 3 to FIG. 5, in the present embodiment, the reflection sheet 19 includes light leading members 22 each configured to lead the light emitted from the LED 17, particularly, the light emitted from the LED 17 at an angle larger than the absolute value of the angle $\theta 1$ ($-\theta 1$) between the light having the peak light intensity and the front direction, toward the front side. The bottom portion 19a of the reflection sheet 19, which has the substantially same size as the bottom plate 14a of the chassis 14, integrally includes light leading members 22. Specifically, in the production of the reflection sheet 19 from the thermoplastic resin, the reflection sheet 19 is subjected to a vacuum forming and the bottom portion 19a of the reflection sheet 19 is bent in a predetermined shape to form the light leading members 22. As illustrated in FIG. 3, the light leading member 22 is provided for each LED 17 arranged linearly on the LED board 18 such that the light leading member 22 surrounds each LED 17. That is, the light leading member 22 has an annular shape in a plan view. The light leading members 22 are arranged in a plane in rows and columns on the bottom portion 19a so as to correspond to the LEDs 17.

Figure 6:
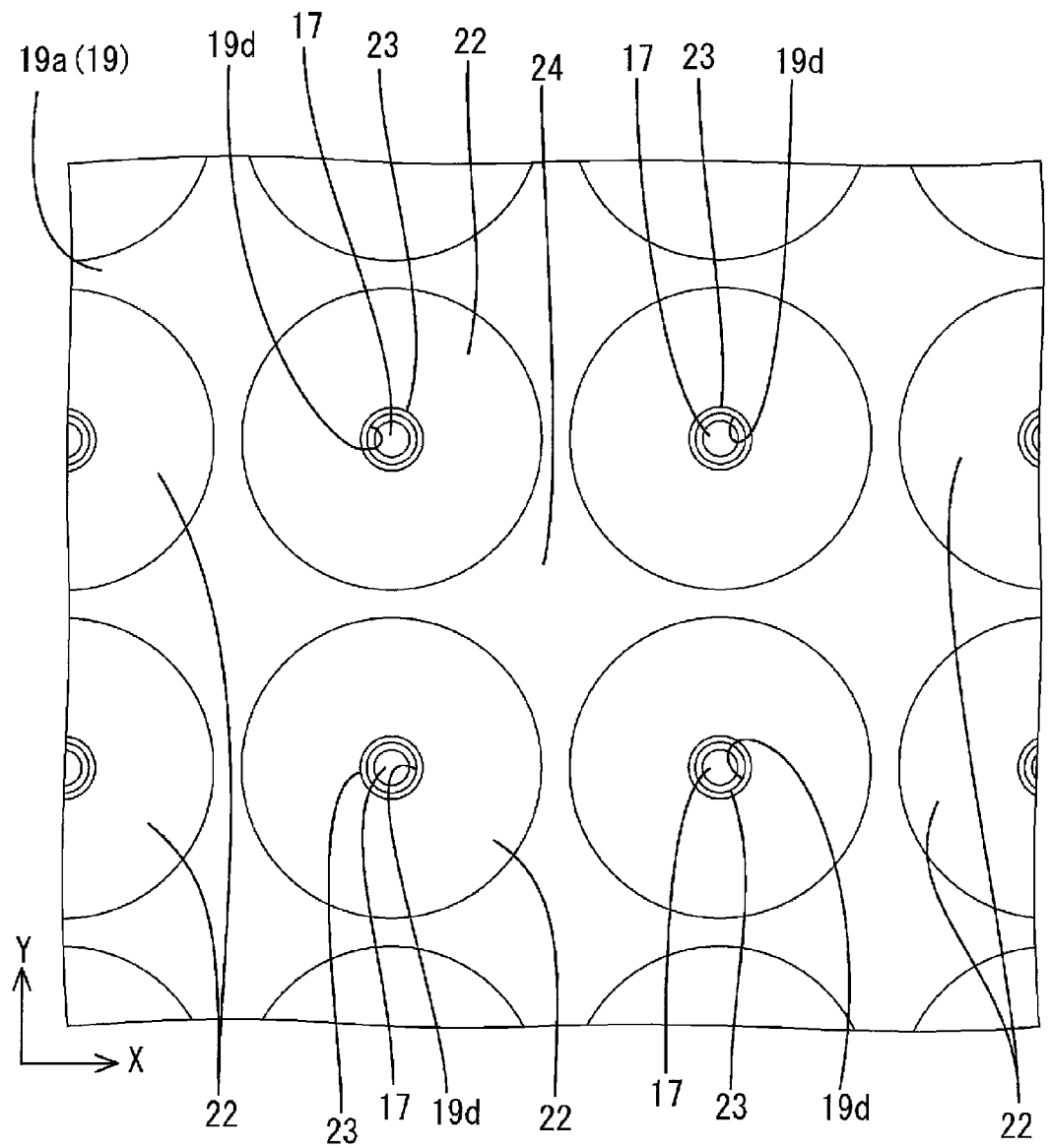
FIG. 6 is a magnified plan view of a major part illustrating the arrangement of the LEDs and the light leading members of the reflection sheet.

As illustrated in FIG. 4 and FIG. 5, the light leading member 22 protrudes from the surface on which the LEDs 17 are mounted, i.e., the mounting surface 18a of the LEDs 17 of the LED board 18, toward the front side. The light leading member 22 protrudes more than the LED 17 toward the front side. Specifically, as illustrated in FIG. 6 and FIG. 7, a major part of the bottom portion 19a, expect a portion including an edge of each light source through hole 19d (a support portion 23 which will be described later), protrudes toward the front side to form the light leading member 22. The remaining portions of the bottom portion 19a are support portions 23 that are supported by the LED board 18. The light leading member 22 includes a protrusion base (a base end section or folding point) at an outer edge of the support portion 23. As described above, the light leading members 22 are arranged in rows and columns (FIG. 3) along the mounting surface 18a of the LED board 18 such that tip portions (tip sections) of the light leading members 22 adjacent to each other in the X-axis direction and the Y-axis direction are aligned. Specifically, the tip portions of the light leading member 22 are aligned with flat portions 24 arranged parallel with the mounting surface 18a of the LED board 18 therebetween. The light leading member 22 protrudes such that a predetermined clearance C is provided between the tip portion of the light leading member 22 and the optical member 15. Specifically, the protrusion height of the light leading member 22 is about ⅓ to about ½ of the distance between the bottom portion 19a of the reflection sheet 19 and the optical member 15. In this configuration, the light leading member 22 is not in contact with the diffuser plate 15a included in the optical member 15. The light leading member 22 is arranged such that the light leading member 22 does not contact with the diffuser plate 15a even if the diffuser plate 15a deforms a little toward a back side. The light leading members 22 each positioned at an outermost portion of the bottom portion 19a is continuous to the rising portion 19b without any steps and have substantially the same inclination angle with respect to the front direction.

Subsequently, a shape of the light leading member 22 will be described in detail. As illustrated in FIG. 6 and FIG. 7, the light leading member 22 has a mortar-like shape (inverted conical shape) as a whole and arranged concentric with the LED 17 positioned at the middle of the light leading member 22 in a plan view. FIG. 7 illustrates a cross section of the LEDs 17 and the light leading member 22 taken along the Z-axis direction and the X-axis direction. FIG. 7 can be considered as a general cross section of the LEDs 17 and the light leading member 22 taken along the Z-axis direction and any direction intersecting with the Z-axis direction (for example, Y-axis direction or a direction intersecting with the X-axis direction and the Y-axis direction). The light leading member 22 has a circular cross-section taken along a direction (the surface extending along the X-axis and the Y-axis direction) perpendicular to the front direction (the Z-axis direction), i.e., a circular circumferential cross-section (FIG. 6). Further, the light leading member 22 has a cross section including inclined surfaces taken along the front direction (the Z-axis direction) (FIG. 7).

An inner circumferential surface of the light leading member 22 is inclined with respect to the front direction (the Z-axis direction) such that the entire of the inner circumferential surface is oriented to the LED 17 located at the middle thereof. The inner circumferential surface is a light leading surface 22a that leads the light emitted from the LED 17 toward the front side. The light leading surface 22a is an arc-like curved surface in a circumferential direction. The light leading surface 22a is an inclined surface in a cross section of the light leading member 22 taken along the Z-axis direction, which is the front direction, and any direction intersecting with the Z-axis direction. The inclined surface is inclined from a start point to an end point of extension of the light leading member 22a at a constant gradient. Then, the light leading surface 22a is arranged on a rear side of an optical path of the light having a peak light intensity (indicated by an arrow in FIG. 7), i.e., on a side opposite to the light exit side, so as not to overlap with the optical path. Specifically, an absolute value of an angle $\theta 2$ ($-\theta 2$) between the light leading surface 22a and the front direction is larger than the absolute value of the angle $\theta 1$ ($-\theta 1$) between the light having the peak light intensity and the front direction. In FIG. 7, the angle $\theta 2$ ($-\theta 2$) between the light leading member 22 and the front direction is indicated. In addition, the traveling direction of the light having the peak light intensity is indicated by an arrow. Further, the angle $\theta 1$ ($-\theta 1$) between the light having the peak light intensity and the front direction is indicated. The light emitted from the LED 17 at an angle larger than the angle $\theta 1$ ($-\theta 1$) between the light having the peak light intensity and the front direction (the light plotted on the side closer to the angle of 90 degrees ($-90$ degrees) than the angle $\theta 1$ ($-\theta 1$) in the graph in FIG. 8) reaches the light leading member 22a and is led toward the front side. The light having the peak light intensity may not reach the light leading surface 22a. In addition, since the absolute value of the angle $\theta 2$ ($-\theta 2$) is set to be larger than the angle $\theta 1$ ($-\theta 1$), the area of the light leading surface 22a can be relatively made large and the light can be led at a wider angle by the light leading surface 22a compared with the case in which the angle $\theta 1$ ($-\theta 1$) and the angle ($-\theta 2$) are opposite. This is more advantageous for suppression of uneven brightness. In the present embodiment, the absolute value of the angle $\theta 2$ ($-\theta 2$) between the light leading member 22 (the light leading surface 22a) and the front direction is larger than the absolute value of the angle $\theta 1$ ($-\theta 1$) with the absolute value of the angle $\theta 2$ ($-\theta 2$) being in a range from 45 degrees to 90 degrees, preferably in a range from 60 degrees to 80 degrees, and more preferably slightly larger than 70 degrees. The light emitted from adjacent LEDs 17 each surrounded by the light leading member 22 can travel through the clearance C provided between the light leading member 22 and the diffuser plate 15a.

The configuration of the present embodiment is as above. The operation of the present embodiment will be described. As illustrated in FIG. 4 and FIG. 5, when the LEDs 17 included in the backlight unit 12 are lit in the use of the liquid crystal display device 10, the light emitted from each LED 17 directly enters the optical member 16 or indirectly enters the optical member 16 after being reflected by the reflection sheet 19, for example. Then, the light passes through the optical member 15 and exits toward the liquid crystal panel 11.

Specifically, as illustrated in FIG. 7, the light emitted from the light emitting surface 20a of the light emitting portion 20 of the LED 17 enters the lens 21 and exits from the light output surface 21a. The light output surface 21a has a substantially hemispherical shape and has a recess 21b in the middle thereof. Thus, the light is widely refracted and allowed to exit radially from the light output surface 21a. The light intensity distribution of the LED 17 is as indicated in FIG. 8. The light having an absolute value of an angle of about 70 degrees with respect to the front direction has the peak light intensity. The absolute value of the angle $\theta 2$ ($-\theta 2$) between the light leading member 22a and the front direction is set to be larger than the absolute value of the angle $\theta 1$ ($-\theta 1$) between the light having the peak light intensity and the front direction. Accordingly, the light having the peak light intensity does not reach the light leading member 22a almost at all and radiates to reach the diffuser plate 15a. Thus, the irradiation area A of the optical member 15 irradiated with the light having the peak light intensity can be large compared with the case that the light having the peak light intensity is oriented toward the front side by the light leading member. Particularly, in the present embodiment, the absolute value of the angle $\theta 1$ ($-\theta 1$) between the light having the peak light intensity and the front direction is about 70 degrees, which is larger than 45 degrees and further 60 degrees. This enables the irradiation area A to be sufficiently large, and thus the uneven brightness is less likely to occur in the brightness distribution of the light exiting from the optical member 15.

The light emitted from the LED 17 at an angle larger than the angle $\theta 1$ ($-\theta 1$) between the light having the peak light intensity and the front direction (the light plotted on the side closer to 90 degrees ($-90$ degrees) than the angle $\theta 1$ ($-\theta 1$) in the graph in FIG. 8) radiates from the middle of the LED 17 and then reaches the light leading surface 22a of the light leading member 22 surrounding the LED 17. Thus, the light is reflected by the light leading surface 22a and led to the front side. The light leading surface 22a has a circular circumferential cross-section, and thus the light radiating from the LED 17 can be led by the light leading surface 22a toward the front side without having a particular directivity. The light reflected by the light leading surface 22a forms a smaller angle with the front direction than the light that is emitted at the angle larger than the angle $\theta 1$ ($-\theta 1$) between the light having the peak light intensity and the front direction and reaches the diffuser plate 15a without being reflected by the light leading member 22. That is, the light reflected by the light leading surface 22a reaches the main plate surface of the diffuser plate 15a at a substantially right angle. The brightness of the light exiting from the optical member 15 is calculated based on the amount of light traveling to the front side. Thus, the light emitted at the angle larger than the angle $\theta 1$ ($-\theta 1$) between the light having the peak light intensity and the front direction can be efficiently used as the outgoing light. This improves the brightness of the outgoing light as a whole. In addition, the light leading member 22 leads the light emitted at the angle larger than the angle $\theta 1$ ($-\theta 1$) between the light having the peak light intensity and the front direction toward the front side. This reduces tone difference (brightness difference) between the irradiation area of the optical member 15 irradiated with the light led by the light leading member 22 and the irradiation area A irradiated with the light having the peak light intensity. Accordingly, the brightness of the outgoing light can be more evenly distributed and the brightness unevenness is less likely to occur.

In addition, since each light leading member 22 is arranged to surround each of the LEDs 17 arranged in columns and rows in a plane, the light emitted from each LED 17 can be led by a separate light leading member 22. This is more preferable for suppression of uneven brightness and improvement of brightness. From a different perspective, since each light leading member 22 surrounds each LED 17, a distance between the middle of the LED 17 and the outer edge of the light leading member 22 is the same for all. This configuration enables the arrangement pith of the LEDs 17 in the X-axis direction and the Y-axis direction to be constant (the same). Accordingly, the distribution density of the LEDs 17 in the chassis 14 is equalized, which is advantageous for suppression of uneven brightness. In addition, since the clearance C is provided between the light leading member 22 and the diffuser plate 15a of the optical member 15, the light emitted from the adjacent LEDs 17 each surrounded by the light leading member 22 can travel through the clearance. With this configuration, unlike the case that the light leading member is in contact with the diffuser plate 15a, the light leading member 22 is less likely to be recognized as a dark portion. This is also preferable for suppression of uneven brightness.

As described above, the uneven brightness in the outgoing light from the backlight unit 12 is less likely to occur in the present embodiment, and thus the following advantages can be also obtained. For example, generally, if the distance between the LED 17 and the optical member 15 in the Z-axis direction is reduced, the uneven brightness may easily occur, because the light emitted from the LED 17 reaches the optical member 15 before being sufficiently spread. However, the light leading member 22 of the present embodiment can suppress the uneven brightness, and thus the distance between the LED 17 and the optical member 15 in the Z-axis direction can be reduced. As a result, the thickness of the backlight unit 12 and the liquid crystal display device 10 can be reduced. Further, generally, if the number of LEDs 17 is reduced, the brightness distribution of the outgoing light may easily include bright portions and dark portions. However, the light leading member 22 of the present embodiment can suppress the uneven brightness, and thus the number of LEDs 17 can be reduced. As a result, the power consumption and the production cost of the backlight unit 12 and the liquid crystal display device 10 can be reduced.

As explained above, the backlight unit 12 of the present embodiment includes the LED 17 as a light source with a light intensity distribution in which light having a peak light intensity travels in a direction inclined with respect to a front direction, the chassis 14 housing the light source and having an opening on a light exit side of the backlight unit 12, and the light leading member 22 extending from the mounting surface of the LED 17 toward the light exit side. The light leading member 22 is configured to lead the light toward the light exit side.

In this embodiment, the LED 17 having the light intensity distribution in which the light having the peak light intensity travels in a direction inclined with respect to the front direction is used as a light source housed in the chassis 14. Accordingly, compared with the LED having a light intensity distribution in which the light having the peak light intensity travels in the front direction, the light source having the above configuration can have a relatively large irradiation area A irradiated with the light having the peak light intensity. Thus, the unevenness in the brightness distribution is less likely to occur.

The light emitted from the LED 17 tends to be more efficiently used as the outgoing light as the angle of the light emitted from the light source with respect to the front direction decreases and tends to be less efficiently used as the outgoing light as the angle of the light emitted from the light source with respect to the front direction increases. Contrary to the above, the irradiation area A of the light having the peak light intensity tends to be larger as the angle of the light having the peak light intensity with respect to the front direction increases, which is preferable for suppression of uneven brightness. Accordingly, if the angle between the light having the peak light intensity and the front direction is increased to suppress the uneven brightness, the light emitted from the LED 17 at a larger angle than the angle between the light having the peak light intensity and the front direction may be less efficiently used as the outgoing light. In such a case, in the irradiation area irradiated with the light having the peak light intensity, the brightness may be insufficient and a dark portion may appear. In addition, the brightness of the outgoing light as a whole may decrease.

The present embodiment includes the light leading member 22 configured to lead the light toward the light exit side. The light leading member 22 extends from the mounting surface of the LEDs 17 toward the light exit side. With this configuration, the light emitted from the LED 17 at a large angle with respect to the front direction can be led by the light leading member 22 toward the front side. Thus, the light can be more efficiently used as the outgoing light. Particularly, since the light emitted at the angle larger than the angle between the light having the peak light intensity and the front direction can be more efficiently used as the outgoing light by the light leading member 22, the irradiation area irradiated with the light having the peak light intensity is less likely to be recognized as the dark portion and the uneven brightness is less likely to occur. In addition, the brightness of the outgoing light as a whole can be improved.

If the uneven brightness is less likely to occur in the outgoing light as above, the thickness of the backlight unit 12 can be reduced, for example. In addition, the number of LEDs 17 can be reduced, and thus the power consumption and the production cost of the backlight unit 12 can be reduced.

The term "front direction" used herein can be defined as "a normal direction with respect to the light exit surface of the backlight unit 12."

The light leading member 22 inclines with respect to the front direction and includes the light leading surface 22a facing the LED 17. With this configuration, the light can change its angle with respect to the front direction depending on the angle between the light leading surface 22a and the front direction. Thus, the light emitted from the LED 17 at a large angle with respect to the front direction can be efficiently led and efficiently used as the outgoing light. This configuration is more preferable for suppression of uneven brightness and improvement of brightness.

The light leading surface 22a is located on a side opposite to the light exit side with respect to the optical path of the light having the peak light intensity, whereby the light leading surface 22a does not overlap with the optical path. With this configuration, the light having the peak light intensity can exit without reaching the light leading surface 22a almost at all. If the light having the peak light intensity is led by the light leading surface, the irradiation area irradiated with the light having the peak light intensity decreases, and thus the uneven brightness is more likely to occur. The present invention is free from such a problem. The irradiation area A irradiated with the light having the peak light intensity can be sufficiently provided. This configuration is preferable for suppression of uneven brightness.

The term "optical path" used herein can be defined as "a trajectory of light emitted from the LED 17 and traveling without being reflected or refracted by other members such as the optical member 15."

The light leading member 22 is inclined such that the light leading surface 22a and the front direction form an angle larger than the angle between the light having the peak light intensity and the front direction. With this configuration, the light can be led by the light leading surface 22a at a wide angle compared with a case in which the angle between the light leading surface 22a and the front direction is smaller than the angle between the light leading surface 22a and the front direction. This configuration is more advantageous for suppression of uneven brightness. In addition, the light leading surface 22a does not overlap with the optical path of the light having the peak light intensity, and thus the light having the peak light intensity does not reach the light leading surface 22a.

Each of the angle between the light leading surface 22a and the front direction and the angle between the light having the peak light intensity and the front direction is in the range from 45 degrees to 90 degrees. In this configuration, the angle between the light having the peak light intensity and the front direction is in the range from 45 degrees to 90 degrees, and thus the irradiation area A irradiated with the light having the peak light intensity can be large. This is preferable for suppression of uneven brightness. In addition, the angle between the light leading surface 22a and the front direction is in the range from 45 degrees to 90 degrees and larger than the angle between the light having the peak light intensity and the front direction. With this configuration, the light having the larger angle with respect to the front direction than the light having the peak light intensity can be more efficiently used. This is more preferable for suppression of uneven brightness and improvement of brightness.

Each of the angle between the light leading surface 22a and the front direction and the angle between the light having the peak light intensity and the front direction is in the range from 60 degrees to 80 degrees. With this configuration, the irradiation area A irradiated with the light having the peak light intensity can be larger. In addition, the light having a larger angle with respect to the front direction than the light having the peak light intensity can be more efficiently used. This is more preferable for suppression of uneven brightness and improvement of brightness.

The LED 17 includes a plurality of LEDs 17 and the LEDs 17 are arranged in a plane in the chassis 14. In addition, the light leading member 22 includes a plurality of light leading members 22 and each of the light leading members 22 separately surrounds each LED 17. With this configuration, the light emitted from each LED 17 can be separately led by each light leading member 22. This is preferable for suppression of uneven brightness and improvement of brightness. In addition, this expands the possibility of arrangement of the LEDs 17 in a plane in the chassis 14.

The LEDs 17 are arranged at regular intervals. With this configuration, the distribution density of the LEDs 17 in the chassis 14 can be equalized. This is more preferable for suppression of uneven brightness.

The light leading member 22 has a circular circumferential cross-section. With this configuration, the light radiating from the LED 17 can be led toward the light exit side without having particular directivity. This is preferable for suppression of uneven brightness.

The light leading surface 22a is an inclined surface in a cross section of the light leading member 22 taken along the front direction. With this configuration, the light can be properly angled by the light leading surface 22a that is the inclined surface in the cross section of the light leading member 22 taken along the front direction. This is preferable for suppression of uneven brightness and improvement of brightness.

The light leading member 22 extends further to the light exit side than the LED 17 does. With this configuration, the light leading member 22 can lead more light toward the light exit side compared with a light leading member extending to the same height as the LED 17. This is more preferable for suppression of uneven brightness and improvement of brightness.

The backlight unit 10 further includes the reflection sheet 19 arranged to cover the surface of the chassis 14 on the light exit side. The light leading member 22 is integrally formed with the reflection sheet 19. With this configuration, the light in the chassis 14 is reflected by the reflection sheet 19, and thus the light can be more efficiently led toward the light exit side. In addition, since the light leading member 22 is integrally formed with the reflection sheet 19, the light leading members 22 can be easily arranged in the chassis 14, for example.

The reflection sheet 19 is formed of a thermoplastic resin. With this configuration, the light leading member 22 can be readily formed by vacuum forming, for example. In addition, the shape of the light leading member 22 can be stabilized. Particularly, this configuration is advantageous when the light leading members 22 are formed on the reflection sheet 19 or the light leading member 22 has a complex shape.

The reflection sheet 19 has a white surface. With this configuration, high light reflectivity can be obtained, and thus the light can be more efficiently led toward the light exit side. This is more preferable for suppression of uneven brightness and improvement of brightness.

The LED 17 is a point light source, and the LED 17 has a light intensity distribution in which the light having the peak light intensity radiates. With this configuration, the irradiation area A irradiated with the light having the peak light intensity can have an annular shape. This is more preferable for suppression of uneven brightness.

The LED 17 includes the light emitting portion 20 having the light emitting surface 20a and the lens 21 arranged to face the light emitting surface 20a. The light emitting portion 20 is configured to emit light. The lens 21 is configured to diffuse and output the light emitted from the light emitting portion 20. With this configuration, the lens 21 can diffuse and output the light emitted from the light emitting portion 20, and thus the light intensity distribution in which the light having the peak light intensity travels in the direction inclined with respect to the front direction can be readily designed.

The lens 21 includes the recess 21b on the surface on the light exit side (a light output surface 21a). With this configuration, the light emitted from the light emitting portion 20 can be properly refracted and diffused in a suitable manner depending on the shape of the recess 21b, and thus the optical design of the lens 21 can be readily made.

The lens 21 is integrally provided with the light emitting portion 20. With this configuration, since the lens 21 and the light emitting portion 20 included in the LED 17 is one component, the number of components can be reduced and the production cost of the LED 17 can be reduced compared with the case that the lens is a separate component than the light emitting portion 20.

The light emitting portion 20 includes the LED chip (LED element). With this configuration, the brightness can be improved and the consumption can be reduced.

The backlight unit 10 further includes the optical member 15 arranged on the light exit side so as to face the LED 17. The light leading member 22 is arranged such that the clearance C is provided between the light leading member 22 and the optical member 15. If there is no clearance between the light leading member and the optical member 15 and the light leading member is in contact with the optical member 15, the light leading member 22 in contact with the optical member 15 may be recognized as a dark portion. In the above configuration, however, there is the clearance C between the light leading member 22 and the optical member 15, and thus the light leading member 22 is less likely to be recognized as a dark portion. This is preferable for suppression of uneven brightness.

The backlight unit 10 further includes the LED board 18 including the mounting surface. The LED board 18 is housed in the chassis 14. The LED 17 includes a plurality of LEDs 17 and the LEDs 17 are mounted on the mounting surface of the LED board 18. With this configuration, the LEDs 17 can be collectively arranged in the chassis 14 by locating the LED board 18 in the chassis 14. This facilitates the mounting operation.

In the above description, the first embodiment of the present invention is explained. The present invention is not limited to the above embodiment. The following modifications may be included in the technical scope of the present invention, for example. In the following modifications, similar parts to those in the above embodiment will be indicated by the same symbols and will not be illustrated or explained.

First Modification of First Embodiment

The first modification of the first embodiment will be explained with reference to FIG. 10 or FIG. 11. The formation area of a light leading member 22-1 is changed, for example.

Figure 10:
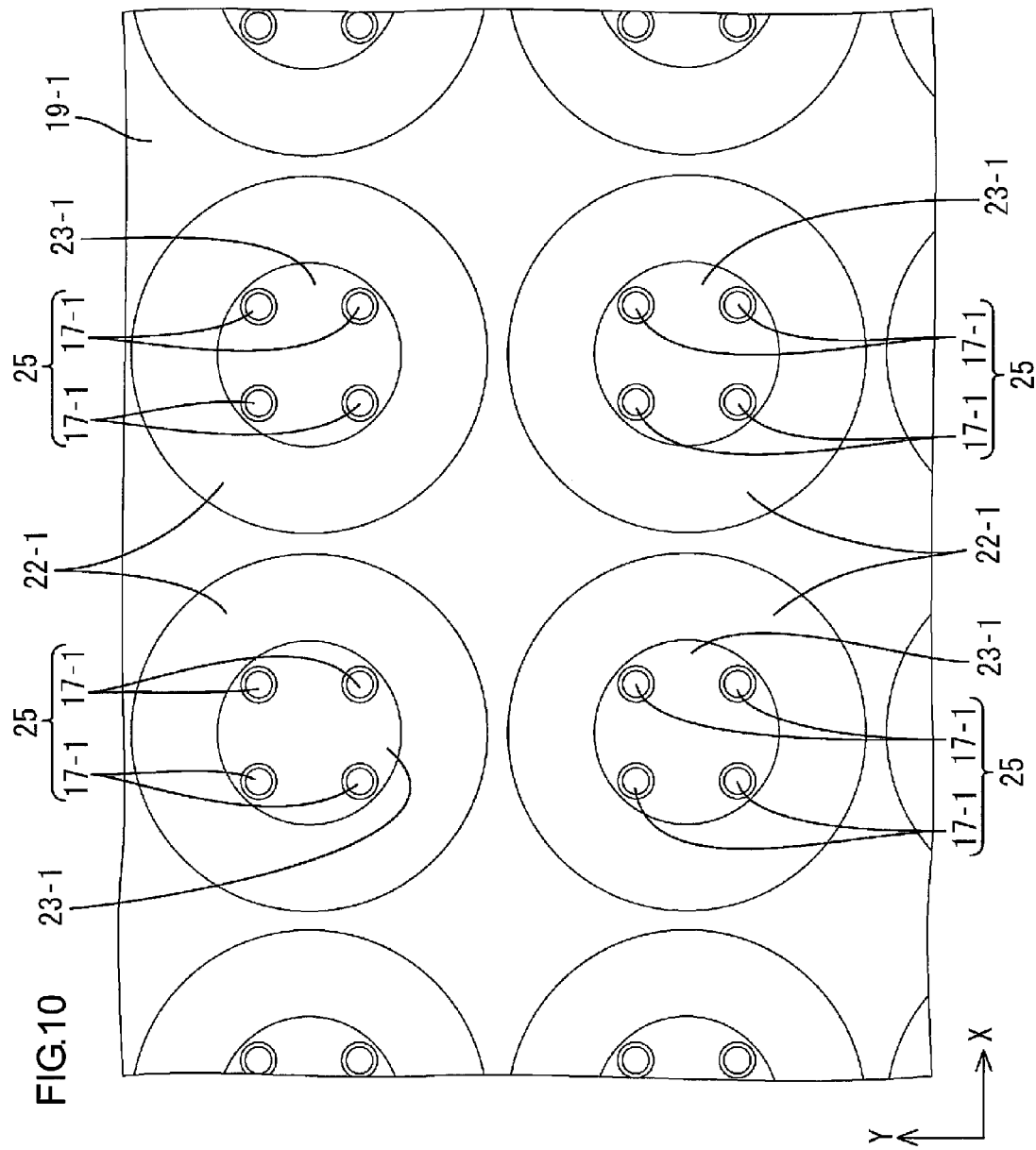
FIG. 10 is a magnified plan view of a major part illustrating an arrangement of the LED groups and the light leading members according to the first modification of the first embodiment.
Figure 11:
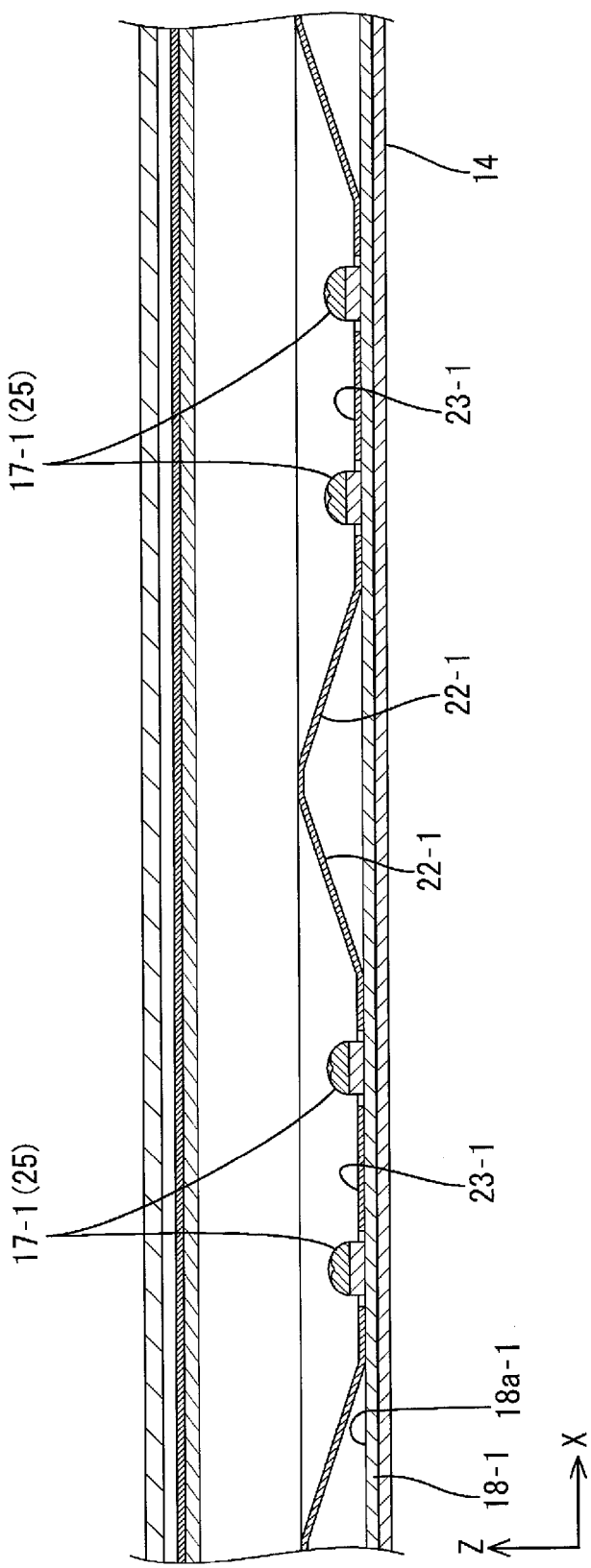
FIG. 11 is magnified cross-sectional view of a major part illustrating the LED groups and the light leading member.

In this modification, as illustrated in FIG. 10 and FIG. 11, the LED groups 25 each include two LEDs 17-1 adjacent to each other in the X-axis direction and two LEDs 17-1 adjacent to each other in the Y-axis direction (a total of four LEDs 17-1). The light leading members 22-1 are each arranged to separately surround each LED group 25. Specifically, the LED groups 25 includes four LEDs 17-1 arranged at regular intervals in the X-axis direction and the Y-axis direction, and the LED groups 25 are arranged on a mounting surface 18a-1 of the LED board 18-1 so as to be aligned in a plane in the X-axis direction and the Y-axis direction. The LED groups 25 are adjacent to each other at substantially regular intervals in the X-axis direction and the Y-axis direction. The intervals between the adjacent LED groups 25 are larger than the intervals between the adjacent LEDs 17-1 included in each LED group 25. A support portion 23-1 of the reflection sheet 19-1 is formed in an area extending across four LEDs 17-1 included in the LED group 25. The support portion 23-1 has a circular shape concentric with the middle of the four LEDs 17-1. The light leading member 22-1 extends from an outer edge of the support portion 23-1 toward the front side and collectively surrounds the four LEDs 17-1. Namely, he light leading member 22-1 has a mortar-like shape (an inverted conical shape) in a plan view. In other words, each light leading member 22-1 separately surrounds each LED groups 25 arranged in the X-axis direction and the Y-axis direction.

Preferably, the total number of the LEDs 17-1 mounted on the LED board 18-1 is equal to the integral multiple of the number of LEDs 17-1 (four in this modification) included in the LED group 25.

As described above, in the present modification, the LEDs 17-1 are arranged in a plane in the chassis 14, and the LED groups 25 each include a predetermined plural number of LEDs 17-1. Further, each light leading member 22-1 separately surrounds each LED group 25. With this configuration, the number of light leading member 22-1 can be reduced, which leads the reduction in cost. In addition, the light emitted from the LED groups 25 including the LEDs 17-1 can be separately led by each light leading member 22, and thus the uneven brightness is less likely to occur and the brightness can be improved.

The intervals between the adjacent LED groups 25 are larger than the intervals between the adjacent LEDs 17-1 included in each of the LED groups 25. With this configuration, each light leading member 22-1 separately surrounding each LED group 25 can be sufficiently large. This allows the light leading member 22-1 to sufficiently exhibit its light leading properties, which is preferable for suppression of uneven brightness and improvement of brightness.

Two LEDs 17-1 are arranged in a direction along one side (the short side) of the chassis 14 and two LEDs 17-1 are arranged in a direction along another side (the long side) of the chassis perpendicular to the one side of the chassis 14. The LED groups 25 each include a total of four LEDs 17-1 arranged in the directions along the one side and another side of the chassis 14. With this configuration, the light emitted from the LEDs 17-1 arranged in the directions along the one side and the another side perpendicular to the one side of the chassis 14 can be efficiently led by the light leading member 22-1, which is preferable for suppression of uneven brightness and improvement of brightness.

Second Modification of First Embodiment

The second modification of the first embodiment will be explained with reference to FIG. 12 or FIG. 13. The formation area of a light leading member 22-2 is changed, for example.

Figure 12:
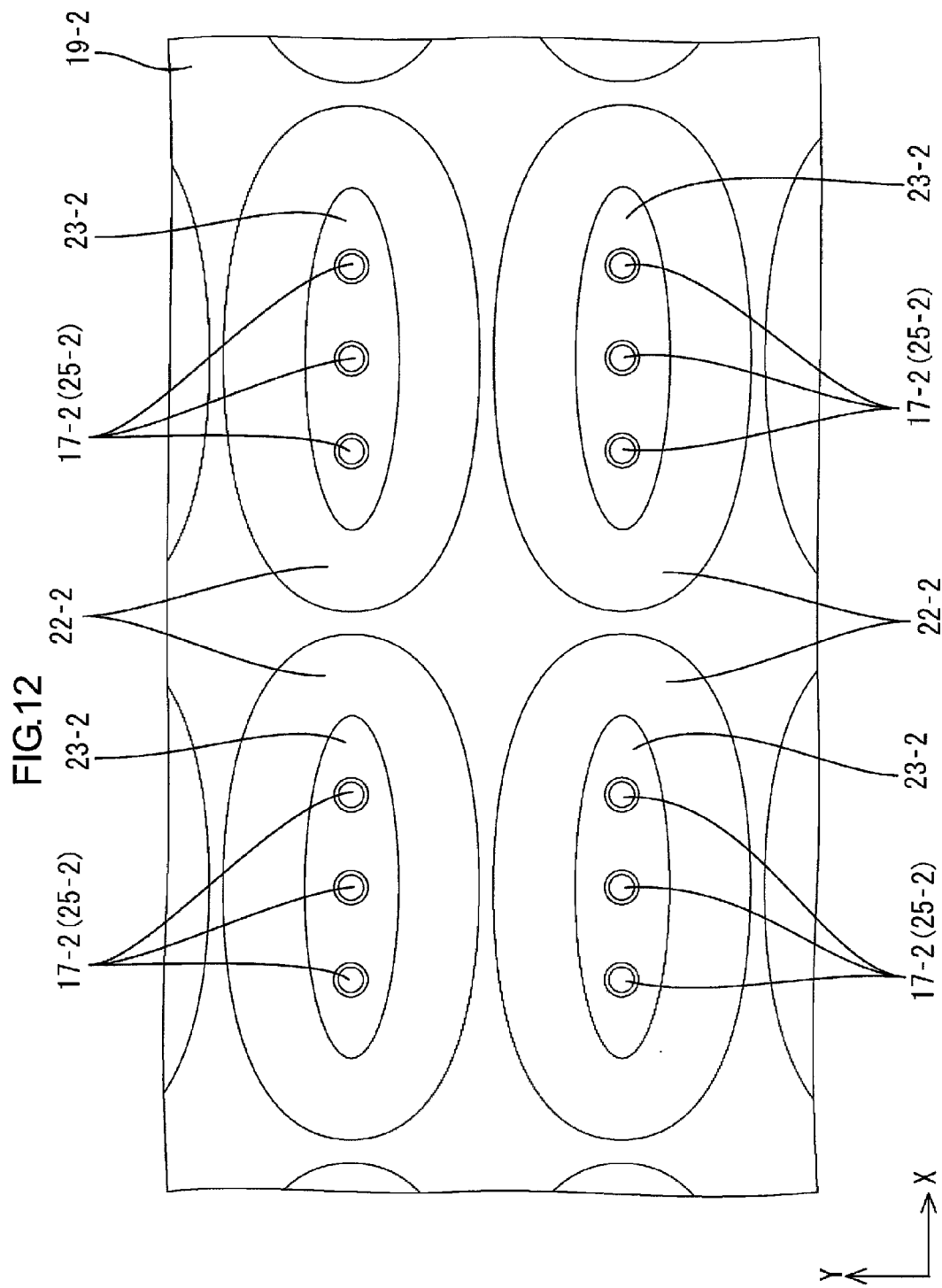
FIG. 12 is a magnified plan view of a major part illustrating an arrangement of the LED groups and the light leading members according to the second modification of the first embodiment.
Figure 13:
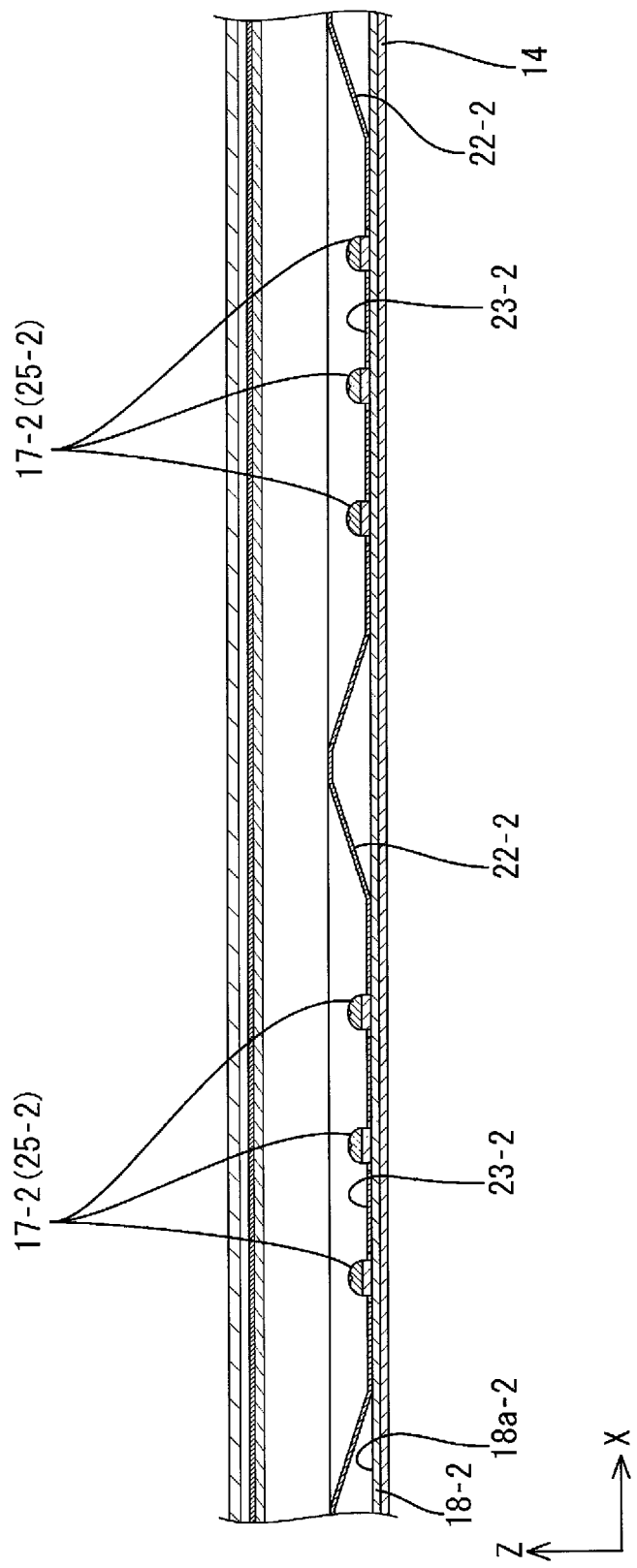
FIG. 13 is a magnified cross-sectional view of a major part illustrating an arrangement of the LED groups and the light leading members.

In this modification, as illustrated in FIG. 12 and FIG. 13, one LED group 25-2 includes three LEDs 17-2 adjacent to each other in the X-axis direction on a LED board 18-2, and the LED group 25-2 is surrounded by one light leading member 22-2. Specifically, the LED group 25-2 includes three LEDs 17-2 arranged linearly at substantially regular intervals in the X-axis direction. The LED groups 25-2 are arranged in the X-axis direction and the Y-axis direction in a plane on a mounting surface 18a-2 of the LED board 18-2. The LED groups 25-2 adjacent to each other are arranged at substantially regular intervals in the X-axis direction and the Y-axis direction. The intervals between the adjacent LED groups 25-2 are larger than the intervals between the adjacent LEDs 17-2 included in the LED groups 25-2. A support portion 23-2 of a reflection sheet 19-2 is formed in an area extending across three LEDs 17-2 included in the LED group 25-2. The support portion 23-2 has a horizontal elliptical shape concentric with middle one of the three LEDs 17-2. A light leading member 22-2 extends from an outer edge of the support portion 23-2 toward the front side and collectively surrounds all of the three LEDs 17-2 included in the LED group 25-2. The light leading member 22-2 has an elliptical mortar-like shape extending along an arrangement direction of the LEDs 17-2 included in the LED group 25-2.

As described above, in this modification, the LEDs 17-2 are linearly arranged in the chassis 14 along a direction along the one side (the short side) of the chassis 14. The LED groups 25-2 each include the LEDs 17-2 linearly arranged. In addition, the light leading member 22-2 extends along an arrangement direction in which the LEDs 17-2 included in each of the LED groups 25-2 are arranged. With this configuration, the light emitted from each of the LEDs 17-2 linearly arranged in the chassis 14 in the direction along the one side of the chassis 14 can be efficiently led by the light leading member 22-2 extending along the arrangement direction of the LEDs 17-2 included in each of the LED groups 25-2. This is preferable for suppression of uneven brightness and improvement of brightness.

Third Modification of First Embodiment

The third modification of the first embodiment will be explained with reference to FIG. 14. The arrangement of an LED 17-3 and a light leading member 22-3 is changed, for example.

Figure 14:
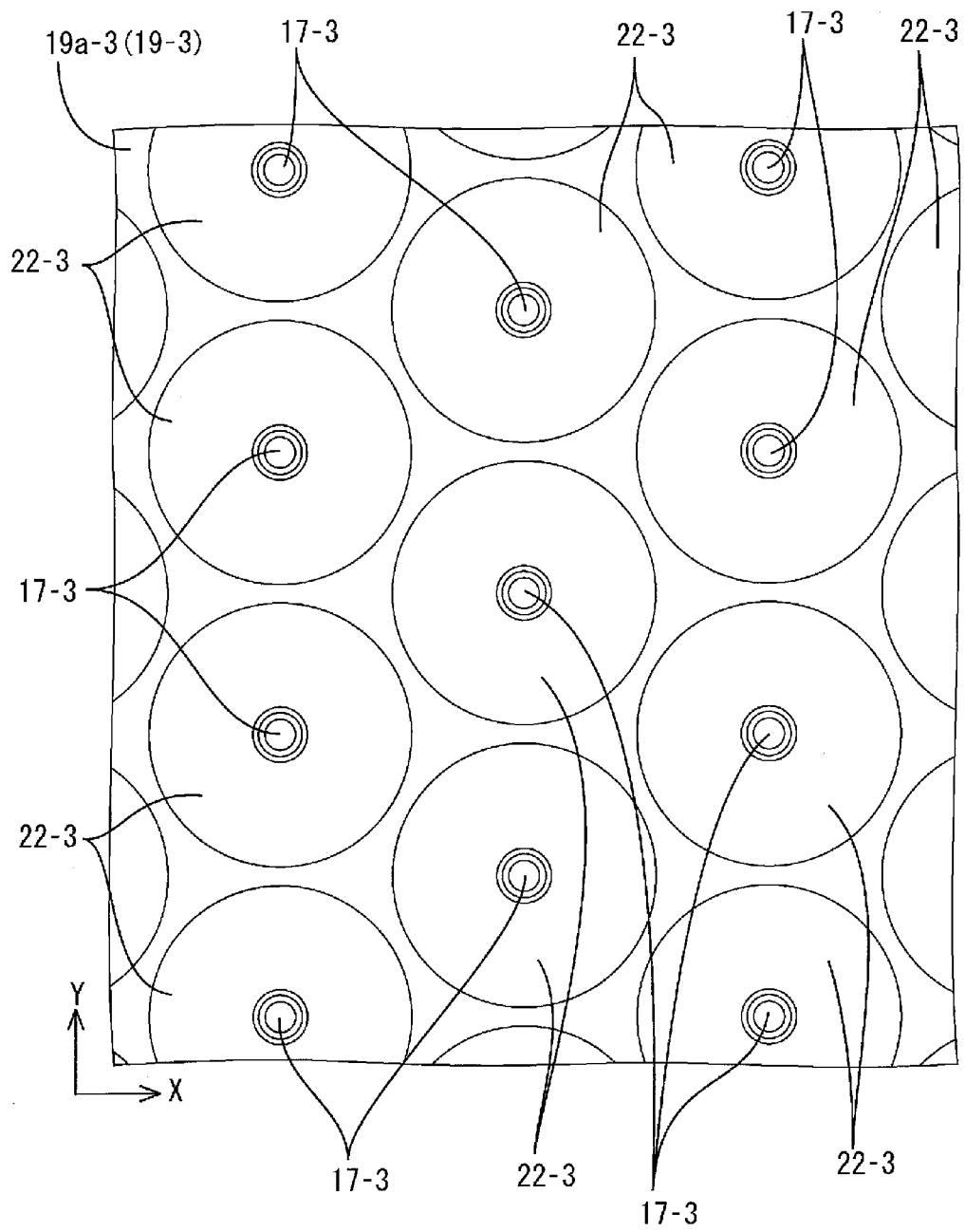
FIG. 14 is a magnified cross-sectional view of a major part illustrating an arrangement of the LEDs and the light leading members according to the third modification of the first embodiment.

As illustrated in FIG. 14, in this modification, the LEDs 17-3 and the light leading members 22-3 are arranged in a staggered manner (in a zigzag manner) in a plan view. Specifically, the LEDs 17-3 and the light leading members 22-3 are arranged in the Y-axis direction to form rows. The rows are arranged in the X-axis direction such that the LED 17-3 and the light leading member 22-3 included in adjacent rows are not aligned in the X-axis direction. With this arrangement, the bottom portion 19a-3 of the reflection sheet 19-3 (the ratio of the light leading members 22-3 to the total area of the bottom portion 19a-3) is more dense with the light leading member 22-3 than the first embodiment, and thus the light emitted by the LED 17-3 can be more efficiently led and used as the outgoing light.

Fourth Modification of First Embodiment

The fourth modification of the first embodiment will be explained with reference to FIG. 15. The cross section of a light leading member 22-4 taken along the Z-axis direction is changed.

Figure 15:
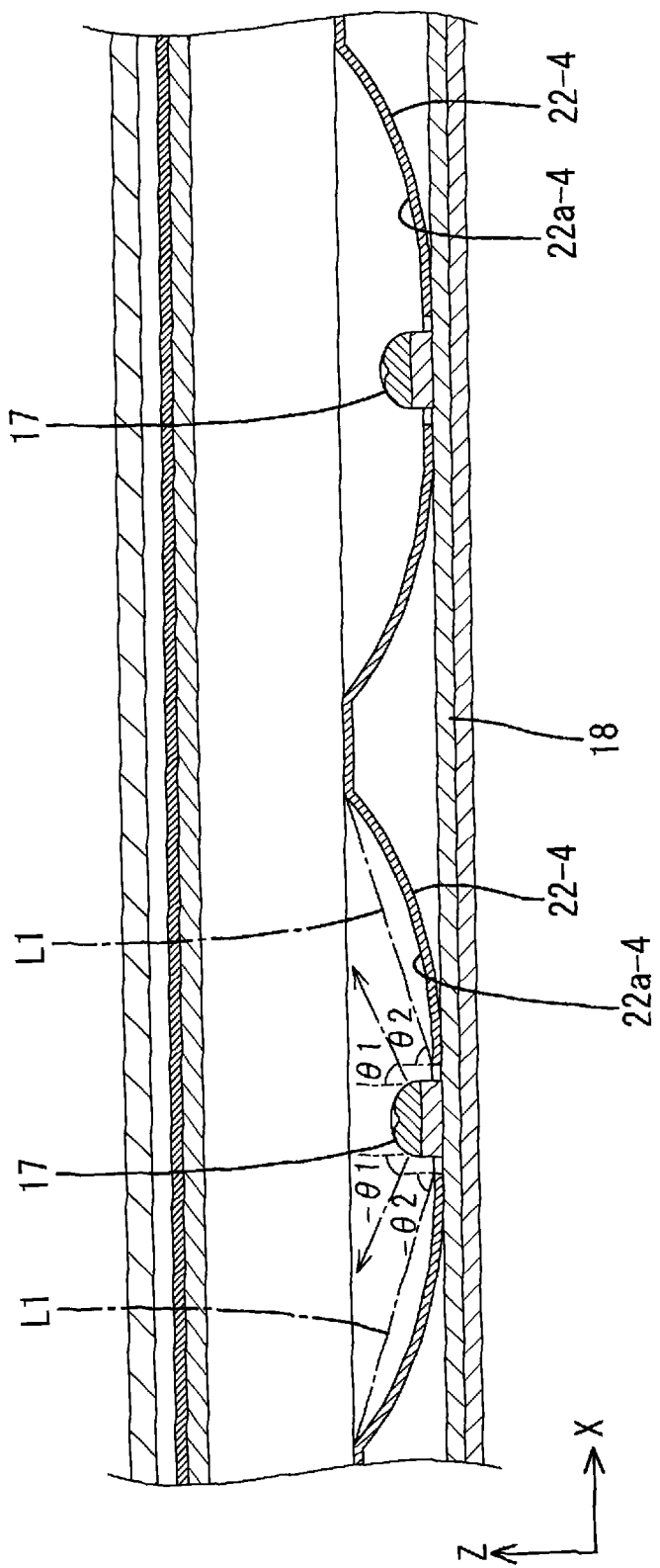
FIG. 15 is a magnified cross-sectional view of a major part illustrating an arrangement of the LEDs and the light leading members according to the fourth modification of the first embodiment.

As illustrated in FIG. 15, the light leading member 22-4 of the present modification has an arc-like cross-section taken along the Z-axis direction (the front direction), and the light leading surface 22a-4 thereof is a substantially curved surface. Specifically, the light leading member 22-4 is curved to the LED board 18 side, i.e., in a direction opposite to the light exit side, and thus has a bowl shape as a whole. The light leading member 22-4 has an arc-like cross-section taken along the Z-axis direction, and the light leading surface 22a-4 thereof is a substantially curved surface. The light leading member 22-4 having such a configuration can sufficiently lead the light emitted from each LED 17 toward the front side by the light leading surface 22a-4 having the arc-like shape. The angle θ2 (−θ2) between the light leading member 22-4 (the light leading surface 22a-4) of the present modification and the front direction (the Z-axis direction) can be defined as the angle θ2 (−θ2) between a line L1 connecting a start point and an end point of extension of the light leading member and the front direction, for example. An absolute value of the angle θ2 (−θ2) is larger than the absolute value of the angle θ1 (−θ1) between the light having the peak light intensity and the front direction. The light leading surface 22a-4 is arranged such that the entire area thereof is located on a rear side of the line L1 and an optical path of the light having a peak light intensity, i.e., on a side opposite to the light exit side.

As described above, in this modification, the light leading surface 22a-4 is an arc-like curved surface in a cross section of the light leading member taken along the front direction. With this configuration, the light can be properly angled by the light leading surface 22a-4 that is the arc-like curved surface in the cross section of the light leading member 22-4 taken along the front direction.

Fifth Modification of First Embodiment

The fifth modification of the first embodiment will be explained with reference to FIG. 16. The cross section of a light leading member 22-5 is further changed from the above fourth modification.

Figure 16:
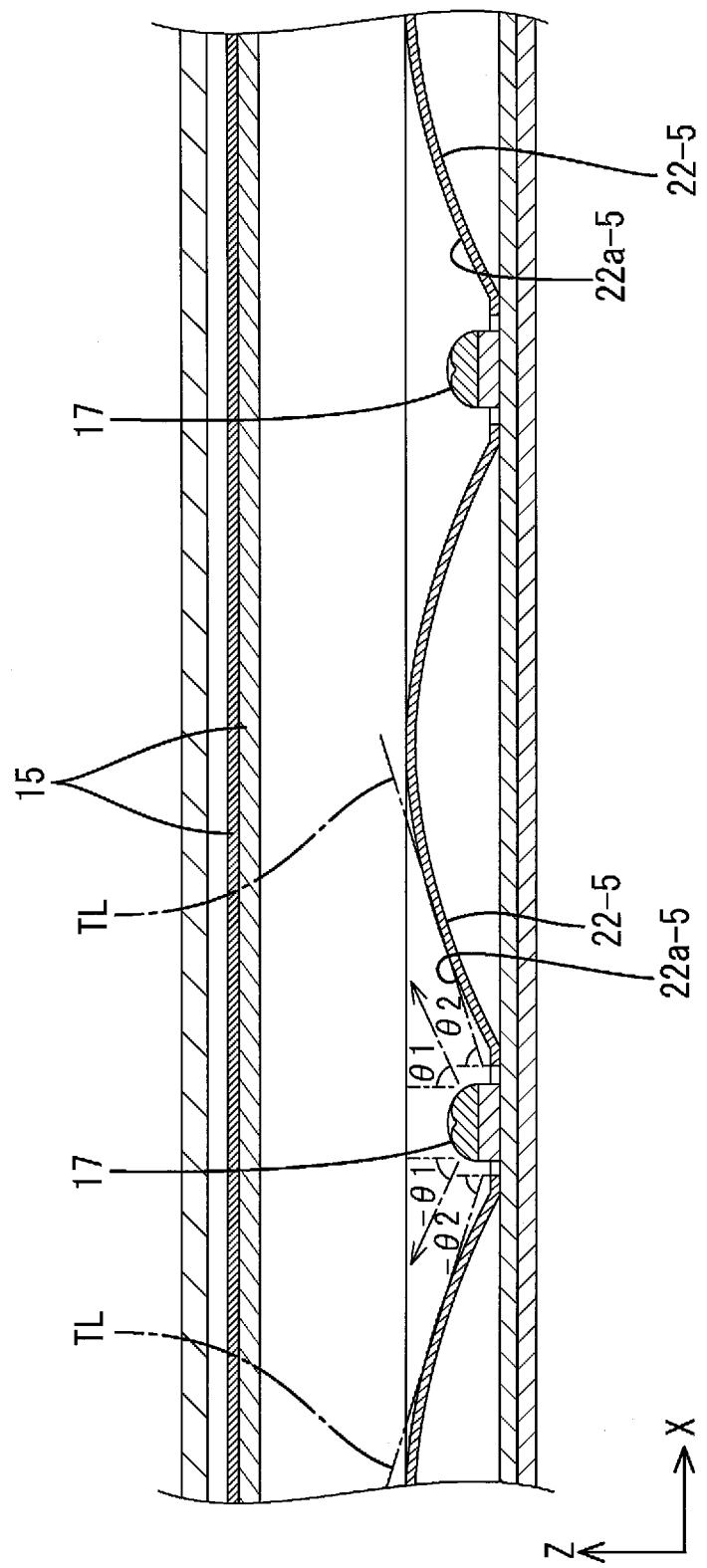
FIG. 16 is a magnified cross-sectional view of a major part illustrating an arrangement of the LEDs and the light leading members according to the fifth modification of the first embodiment.

As illustrated in FIG. 16, the light leading member 22-5 of the present modification protrudes toward the optical member 15, i.e., the light exit side, such that the distance between the light leading member 22-5 and the optical member 15 gradually decreases. Namely, the light leading member 22-5 has the arc-like cross-section taken along the Z-axis direction (the front direction), and thus the light leading surface 22a-5 is a curved surface curved closer to the optical member 15. The light leading member 22-5 having such a configuration can sufficiently lead the light emitted from each LED 17 toward the front side by the light leading surface 22a-5 having the arc-like shape. The angle θ2 (−θ2) between the light leading member 22-5 (the light leading surface 22a-5) of the present modification and the front direction (the Z-axis direction) can be defined as the angle θ2 (−θ2) between a tangent line TL to the curve and the front direction, for example. The tangent line TL to the curve takes a middle point between a start point and an end point of extension of the light leading member as a contact point. An absolute value of the angle θ2 (−θ2) is larger than the absolute value of the angle θ1 (−θ1) between the light having the peak light intensity and the front direction. The light leading surface 22a-5 is arranged such that the entire area thereof is located on a rear side of the tangent line TL and an optical path of the light having a peak light intensity, i.e., located on a side opposite to the light exit side.

Sixth Modification of First Embodiment

The sixth modification of the first embodiment will be explained with reference to FIG. 17. The inclination angle of a light leading member 22-6 with respect to the front direction is changed.

Figure 17:
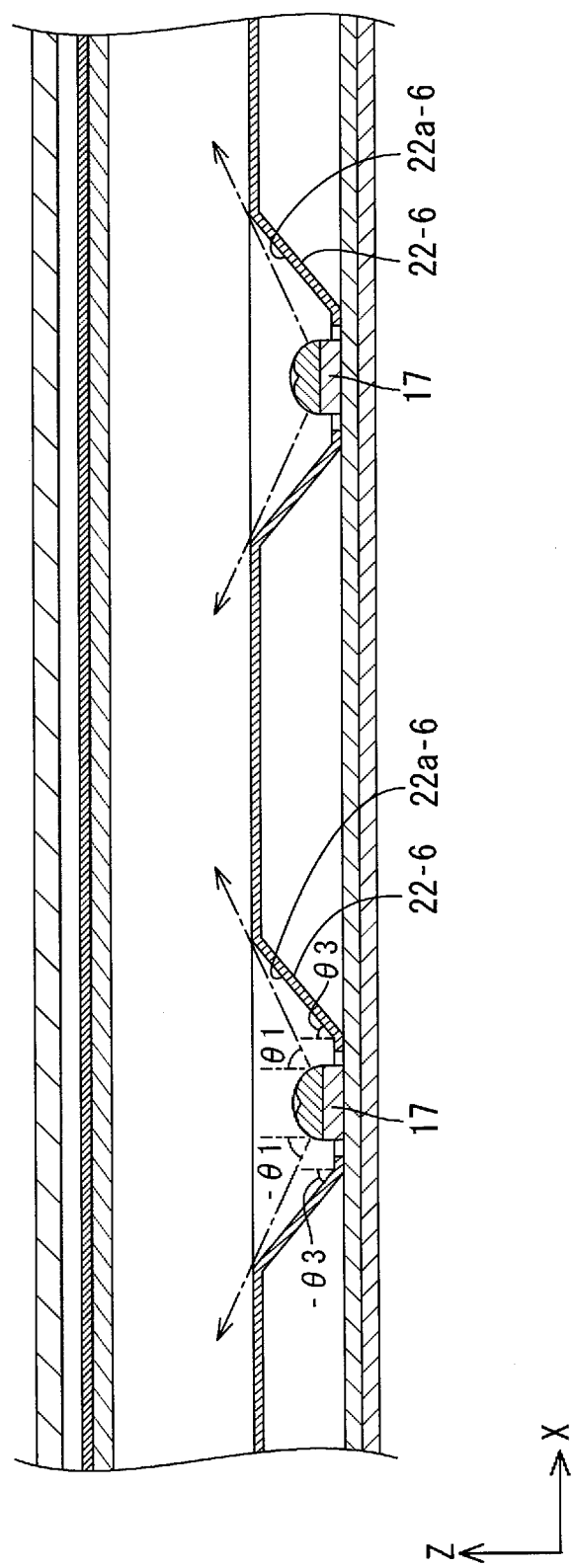
FIG. 17 is a magnified cross-sectional view of a major part illustrating an arrangement of the LEDs and the light leading members according to the sixth modification of the first embodiment.

As illustrated in FIG. 17, the light leading member 22-6 of the present modification is inclined with respect to the front direction (the Z-axis direction), and an absolute value of the angle θ3 (−θ3) is smaller than the absolute value of the angle θ1 (−θ1) between the light having the peak light intensity and the front direction. This relationship between angles is opposite to the relationship between angles in the above first embodiment. The light leading member 22-6 of the present modification is configured to extend from the support portion 23-6 with a length (protrusion length to the front side) so as not to overlap with the light having the peak light intensity (indicated by an arrow in FIG. 17). With this configuration, although the absolute value of the angle θ3 (−θ3) between the light having the peak light intensity and the front direction is smaller than the absolute value of the angle θ1 (−θ1) between the light having the peak light intensity and the front direction, the light leading member 22-6 is arranged on a rear side of the optical path of the light having a peak light intensity, i.e., on a side opposite to the light exit side.

Seventh Modification of First Embodiment

The seventh modification of the first embodiment will be explained with reference to FIG. 18. The shape of a light leading member 22-7 is changed.

Figure 18:
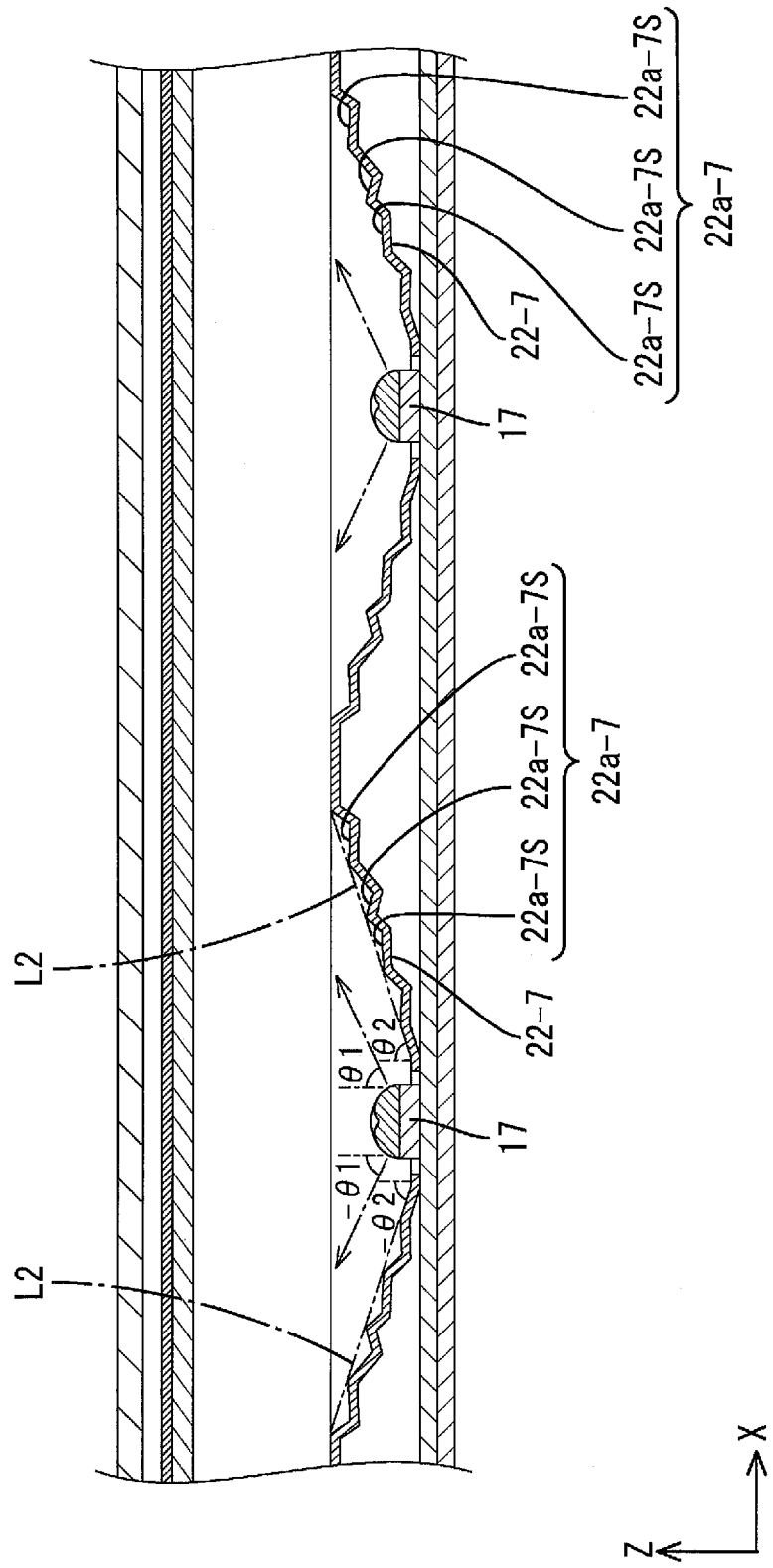
FIG. 18 is a magnified cross-sectional view of a major part illustrating an arrangement of the LEDs and the light leading members according to the seventh modification of the first embodiment.

As illustrated in FIG. 18, the light leading member 22-7 of this modification has a zigzag cross-section taken along the front direction (the Z-axis direction) and any direction intersecting with the front direction. Namely, the light leading member 22-7 has a plurality of bending points between the start point and the endpoint of the extension of the light leading member 22-7. This divides the light leading surface 22a-7 into divided light leading surfaces 22a-7S with the bending portions therebetween. Angles between each divided light leading surface 22a-7 and the front direction are different from each other. When the light leading surface 22a-7 is taken as a whole, the angle θ2 (−θ2) between the light leading surface 22a-7 as a whole and the front direction can be defined as the angle θ2 (−θ2) between a line L2 connecting bending points with each other at protruded points and the front direction. An absolute value of the angle θ2 (−θ2) is larger than an absolute value of the angle θ1 (−θ1) between the light having the peak light intensity and the front direction. The light leading surface 22a-5 is arranged such that the entire area of the light leading surface 22a-7 is located on a rear side of the line L2 and the optical path of the light having a peak light intensity, i.e., on a side opposite to the light exit side.

One or more of the divided light leading surfaces 22a-7S may form an angle of 90 degrees, more than 90 degrees, or 0 degree, with the front direction. Two or more of the divided light leading surfaces may form the same angle with the front direction. Further, all of the divided light leading surfaces 22a-7S may form the same angle with the front direction. One or more of the bending points included in the light leading member 22-7 may not be on the line L2. The bending point may be on the rear side of the line L2.

Second Embodiment

The second embodiment of the present invention will be explained with reference to FIG. 19 or FIG. 20. In the second embodiment, the cross section of the light leading member 122 taken along the X-axis direction and the Y-axis direction is changed. The construction, operations and effects same as the first embodiment will not be explained. In addition, the cross section of the light leading member 122 of the present embodiment is the same as that of the light leading member 22 of the first embodiment illustrated in FIG. 4, FIG. 5, and FIG. 7 and will not be explained.

Figure 19:
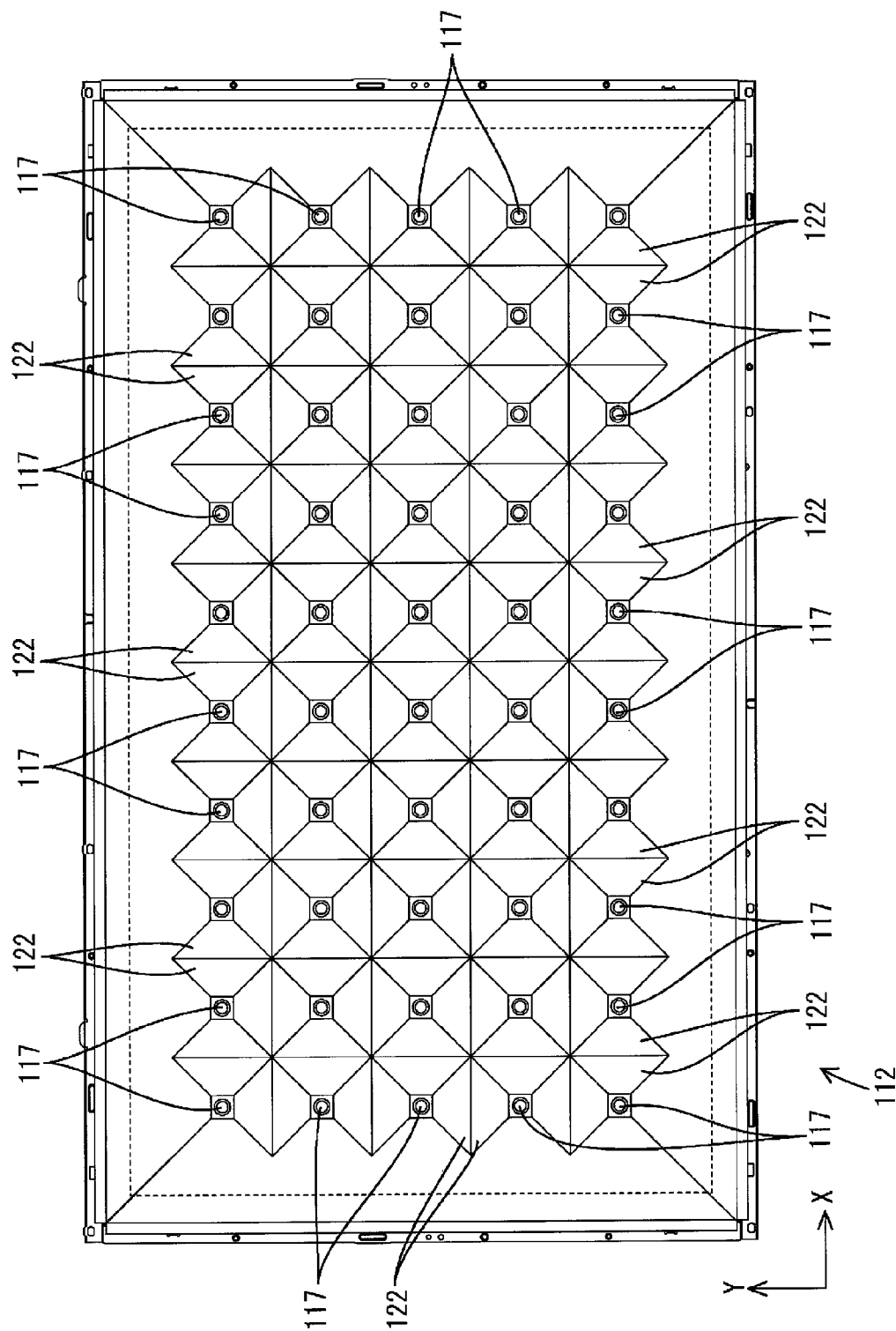
FIG. 19 is a plan view illustrating an arrangement of the LED and the light leading member of the reflection sheet according to the second embodiment of the present invention.
Figure 20:
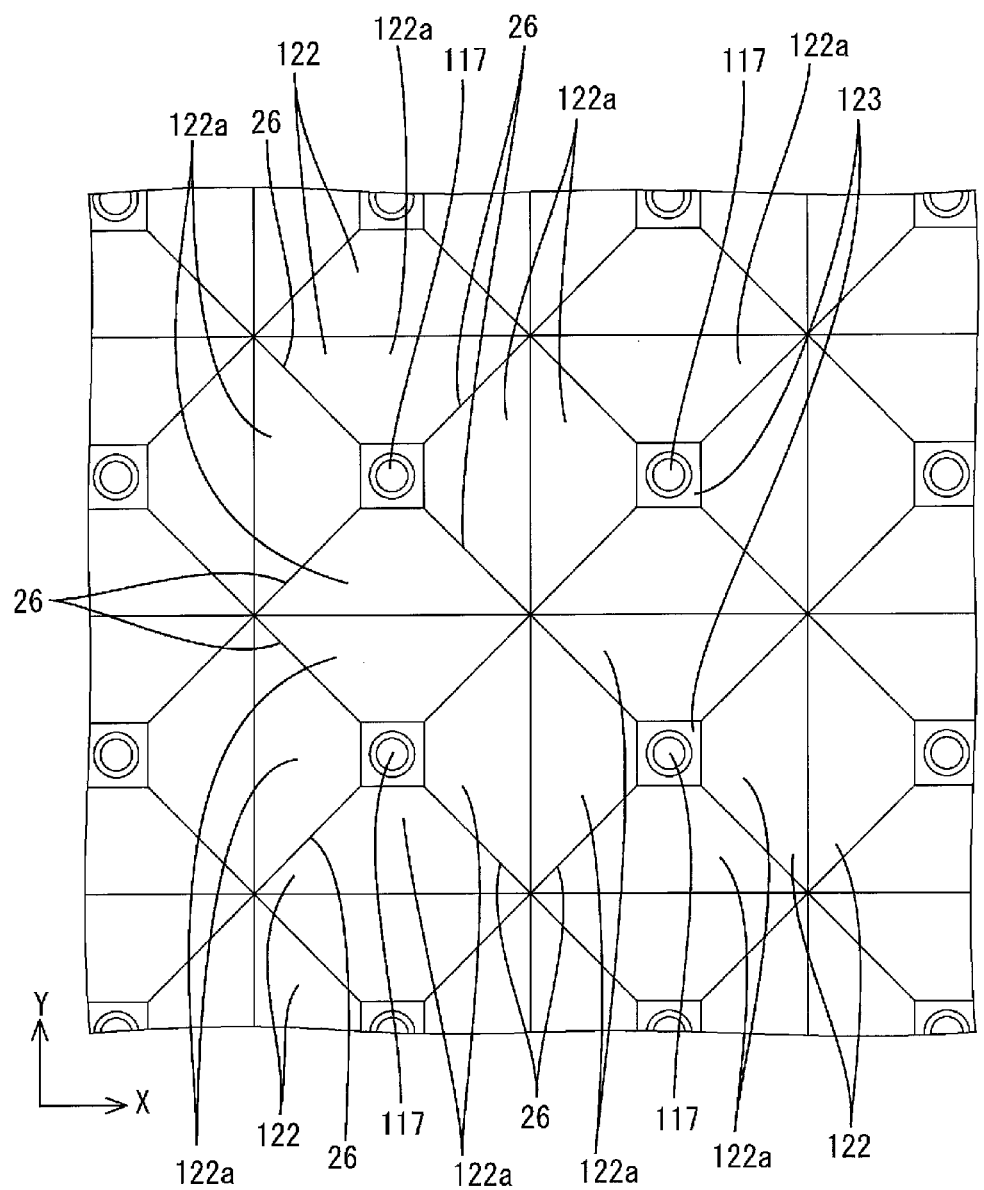
FIG. 20 is a magnified plan view of a major part illustrating an arrangement of the LEDs and the light leading members.

As illustrated in FIG. 19 and FIG. 20, the light leading member 12 of the present embodiment has an inverted quadrangular pyramid shape as a whole and surrounds one LED 17. Specifically, the light leading member 122 has a quadrangular cross-section taken along a direction perpendicular to the front direction (the Z-axis direction), i.e., a rectangular circumferential cross-section. Namely, four light leading surfaces 122a are provided corresponding to four sides of the quadrangle of the light leading member 122. Each light leading surface 122a is inclined with respect to the front direction (the Z-axis direction) so as to be oriented to the LED 117 located on the middle thereof. Between the light leading surfaces 122a adjacent to each other in the circumferential direction (boundary position) of the light leading member 122, a valley section 26 is provided. The valley sections 26 each extend radially from the middle of the LED 117 to the end point of the extension of the light leading member 122. The valley portion 26 enables the light leading member 122 to have high shape stability. The light emitted from the LED 117 can be stably angled by the light leading surface 122a, and thus the optical characteristic of the backlight unit 112 can be stably exhibited. Further, the support portion 123 has a quadrangular shape in a plan view corresponding to the shape of the light leading member 122 in the circumferential direction.

As described above, the light leading member 122 has a rectangular circumferential cross-section. With this configuration, the shape of the light leading member 122 can be stabilized, for example.

Hereinabove, the second embodiment of the present invention is explained. The present invention is not limited to the above embodiment. The following modifications may be included in the technical scope of the present invention, for example. In the following modifications, similar parts to those in the above embodiment will be indicated by the same symbols and will not be illustrated or explained.

First Modification of Second Embodiment

The first modification of the second embodiment will be explained with reference to FIG. 21. Herein, the formation area of a light leading member 122-1 is changed. The cross section of the light leading member 122-1 of the present modification is the same as that of the light leading member 22-1 of the first modification of the first embodiment illustrated in FIG. 11 and will not be explained.

Figure 21:
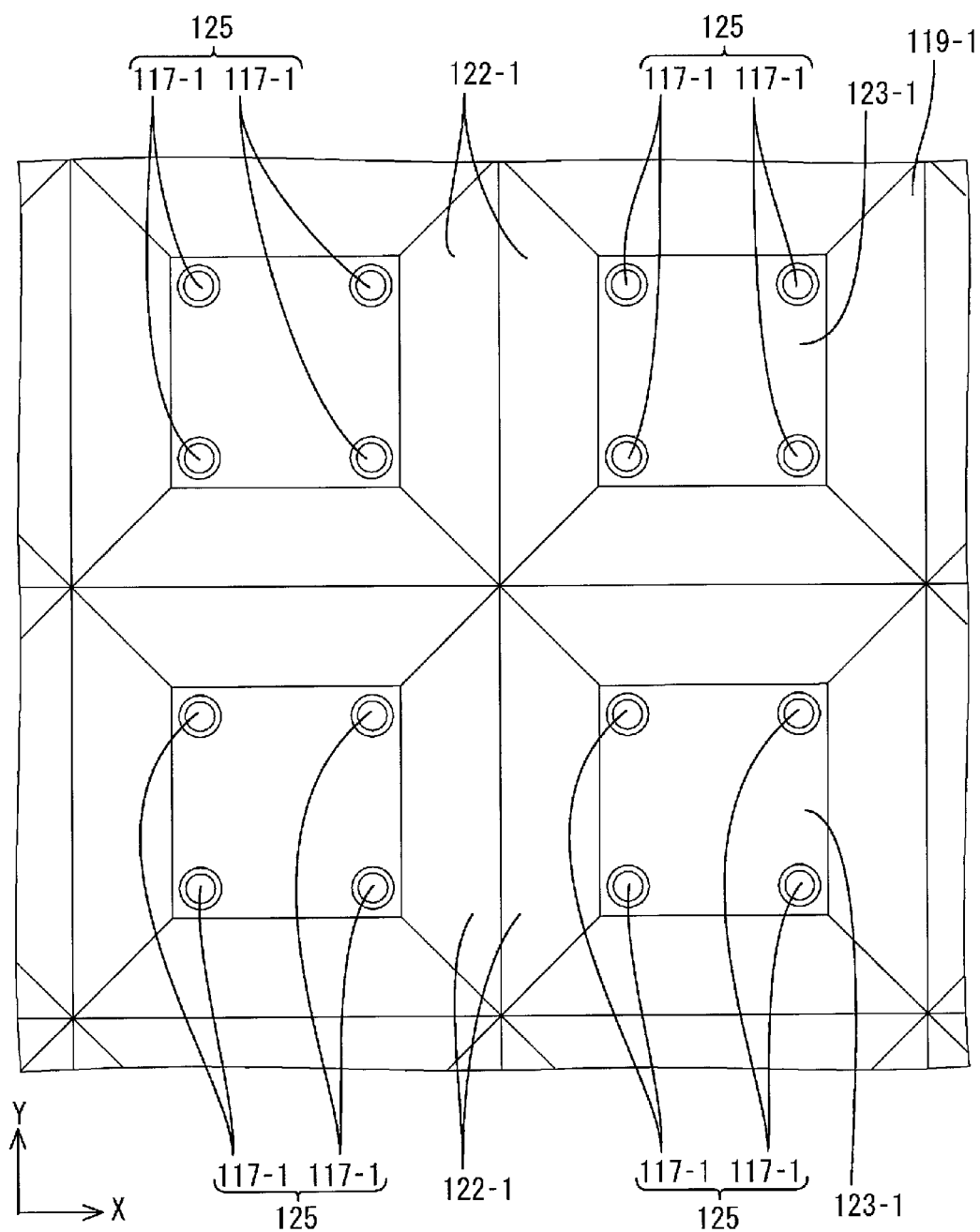
FIG. 21 is a magnified plan view of a major part illustrating an arrangement of the LED groups and the light leading members according to the first modification of the second embodiment.

In this modification, as illustrated in FIG. 21, the LED groups 125 each include two LEDs 117-1 adjacent to each other in the X-axis direction and two LEDs 117-1 adjacent to each other in the Y-axis direction (a total of four LEDs 17-1). The light leading members 122-1 are each arranged to separately surround each LED group 125. Specifically, the LED groups 125 includes four LEDs 117-1 arranged at regular intervals in the X-axis direction and the Y-axis direction, and the LED groups 125 are arranged on a mounting surface 18a-1 of the LED board 18-1 (FIG. 11) so as to be aligned in a plane in the X-axis direction and the Y-axis direction. The LED groups 125 are adjacent to each other at substantially regular intervals in the X-axis direction and the Y-axis direction. The intervals between the adjacent LED groups 125 are larger than the intervals between the adjacent LEDs 117-1 included in each LED group 125. A support portion 123-1 of the reflection sheet 119-1 is formed in an area extending across four LEDs 117-1 included in the LED group 125. The support portion 123-1 has a rectangular shape in which each of the four LEDs 117-1 is arranged each of four corners of the rectangular shape. The light leading member 122-1 extends from an outer edge of the support portion 123-1 toward the front side and collectively surrounds the four LEDs 117-1. Namely, he light leading member 22-1 has an inverted quadrangular pyramid shape. In other words, each light leading member 122-1 separately surrounds each LED groups 125 arranged in the X-axis direction and the Y-axis direction. Preferably, the total number of the LEDs 117-1 mounted on the LED board 18-1 is equal to the integral multiple of the number of LEDs 117-1 (four in this modification) included in the LED group 125.

Second Modification of Second Embodiment

The second modification of the second embodiment will be explained with reference to FIG. 22. Herein, the formation area of a light leading member 122-2 is changed. The cross section of the light leading member 122-2 of the present modification is the same as that of the light leading member 22-2 of the second modification of the first embodiment illustrated in FIG. 13 and will not be explained.

Figure 22:
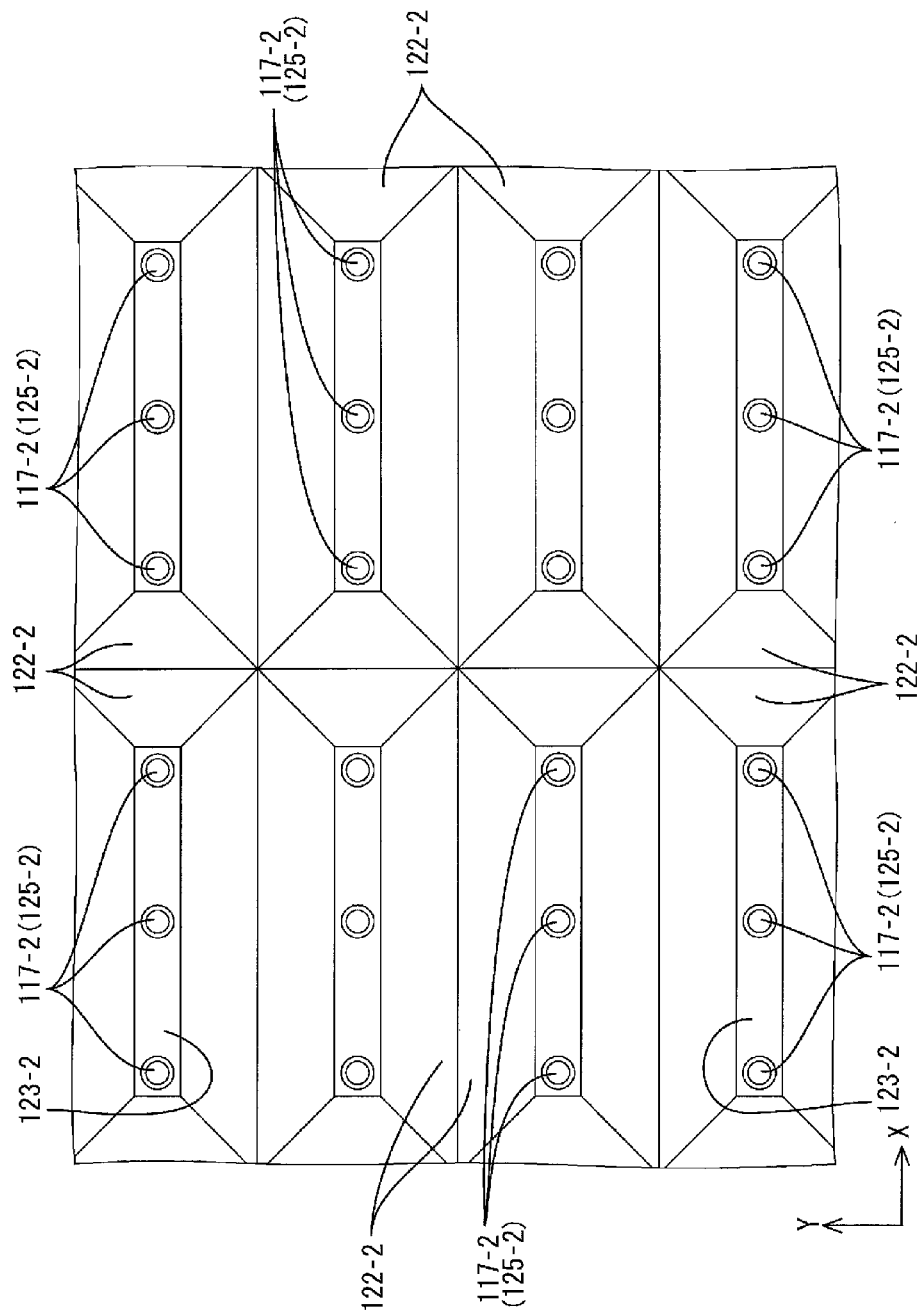
FIG. 22 is a magnified plan view of a major part illustrating an arrangement of the LED groups and the light leading members according to the second modification of the second embodiment.

In this modification, as illustrated in FIG. 22, each one LED group 125-2 includes three LEDs 117-2 adjacent to each other in the X-axis direction on the LED board 18-2 (see FIG. 13) in a plane. The light leading member 122-2 surrounds one LED group 125-2. Specifically, the LED group 125-2 includes three LEDs 117-2 arranged linearly in the X-axis direction at substantially regular intervals. The LED groups 125-2 are arranged in the X-axis direction and the Y-axis direction in a plane on the mounting surface 18a-2 of the LED board 18-2 (see FIG. 13). The LED groups 125-2 adjacent to each other in the X-axis direction and the Y-axis direction are arranged at substantially regular intervals. The intervals between the adjacent LED groups 125-2 are larger than the intervals between the adjacent LEDs 117-2 included in the LED groups 125-2. A support portion 123-2 of a reflection sheet 119-2 is formed in an area extending across three LEDs 117-2 included in the LED group 125-2. The support portion 123-2 has an (landscape) elongated rectangular shape extending along the X-axis direction. The light leading member 122-2 extends from an outer edge of the support portion 123-2 toward the front side and collectively surrounds all of the three LEDs 117-2 included in the LED group 125-2. The light leading member 122-2 has an inverted quadrangular pyramid shape extending along the X-axis direction, i.e., an arrangement direction of the LEDs 117-2 included in the LED group 125-2.

Third Modification of Second Embodiment

The third modification of the second embodiment will be explained with reference to FIG. 23. Herein, the shape of a light leading member 122-3 is changed, for example.

Figure 23:
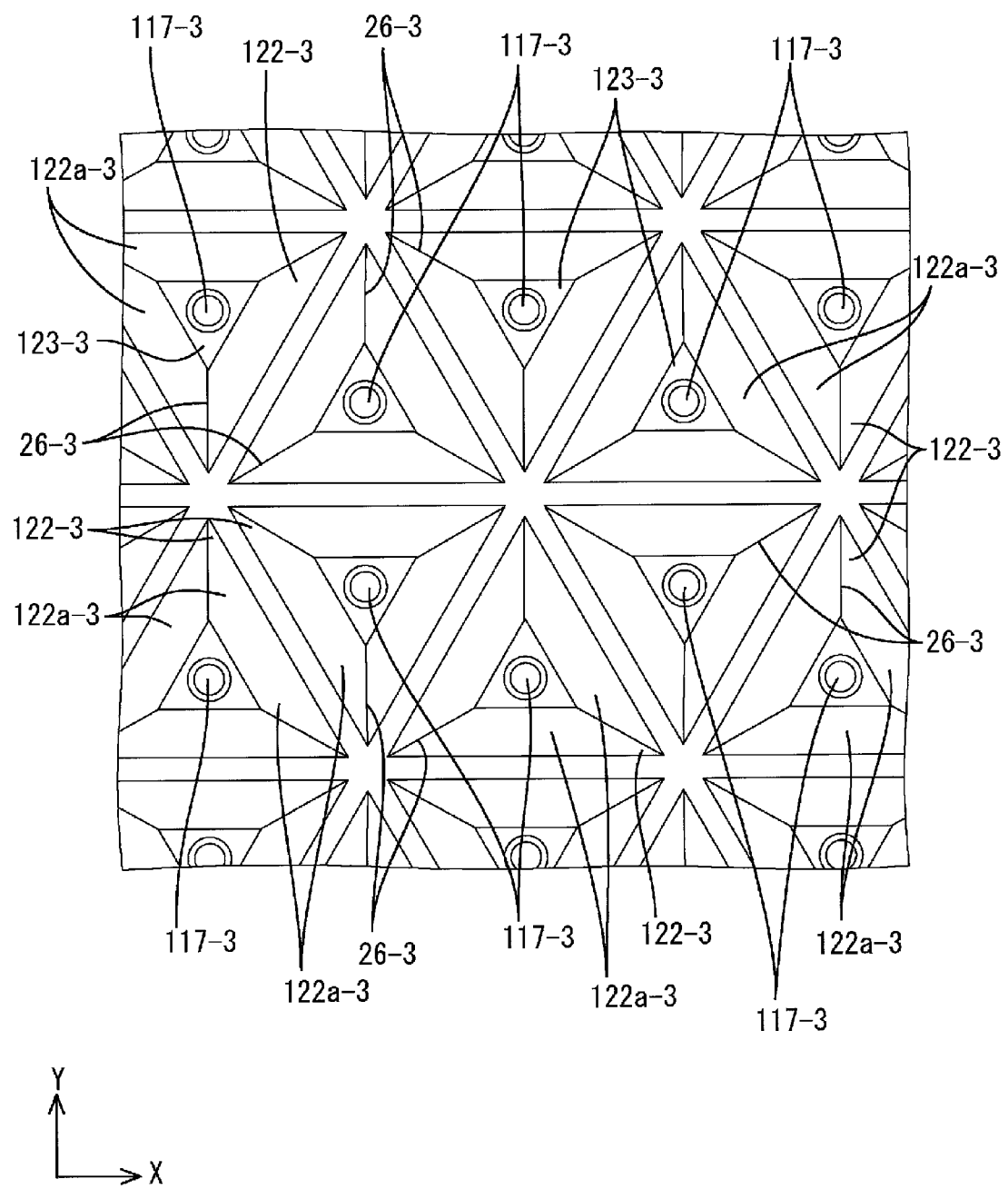
FIG. 23 is a magnified plan view of a major part illustrating an arrangement of the LEDs and the light leading members according to the third modification of the second embodiment.

In this modification, as illustrated in FIG. 23, each light leading member 122-3 has an inverted pyramid shape and separately surrounds each of LEDs 117-3. The light leading member 122-3 has a triangular cross-section taken along a direction perpendicular to the front direction (the Z-axis direction), i.e., a triangular circumferential cross-section. Namely, three light leading surfaces 122a-3 are provided corresponding to three sides of the triangle of the light leading member 122-3. Each light leading surface 122a-3 is inclined with respect to the front direction (the Z-axis direction) so as to be oriented to the LED 117-3 located on the middle thereof. Between the light leading surfaces 122a-3 adjacent to each other in the circumferential direction of the light leading member 122-3 (at a boundary position), a valley section 26-3 is provided. The triangle formed by connecting three apexes of the light leading member 122-3 is a substantially equilateral triangular shape. One side of the light leading member 122-3 matches the X-axis direction and the other sides thereof each arranged parallel with one side of adjacent one of the light leading portions 122-3. That is, the LEDs 117-1 are arranged in a substantially staggered manner (substantially zigzag manner). A support portion 123-3 included in the reflection sheet 119-3 has a triangle shape in a plan view with the LED 117-3 on the middle thereof.

Third Embodiment

The third embodiment of the present invention will be explained with reference to FIG. 24 to FIG. 26. In the third embodiment, the arrangement of LEDs 217 and the shape of a light leading member 222 are changed from those in the second embodiment. The construction, operations and effects same as the second embodiment will not be explained.

Figure 24:
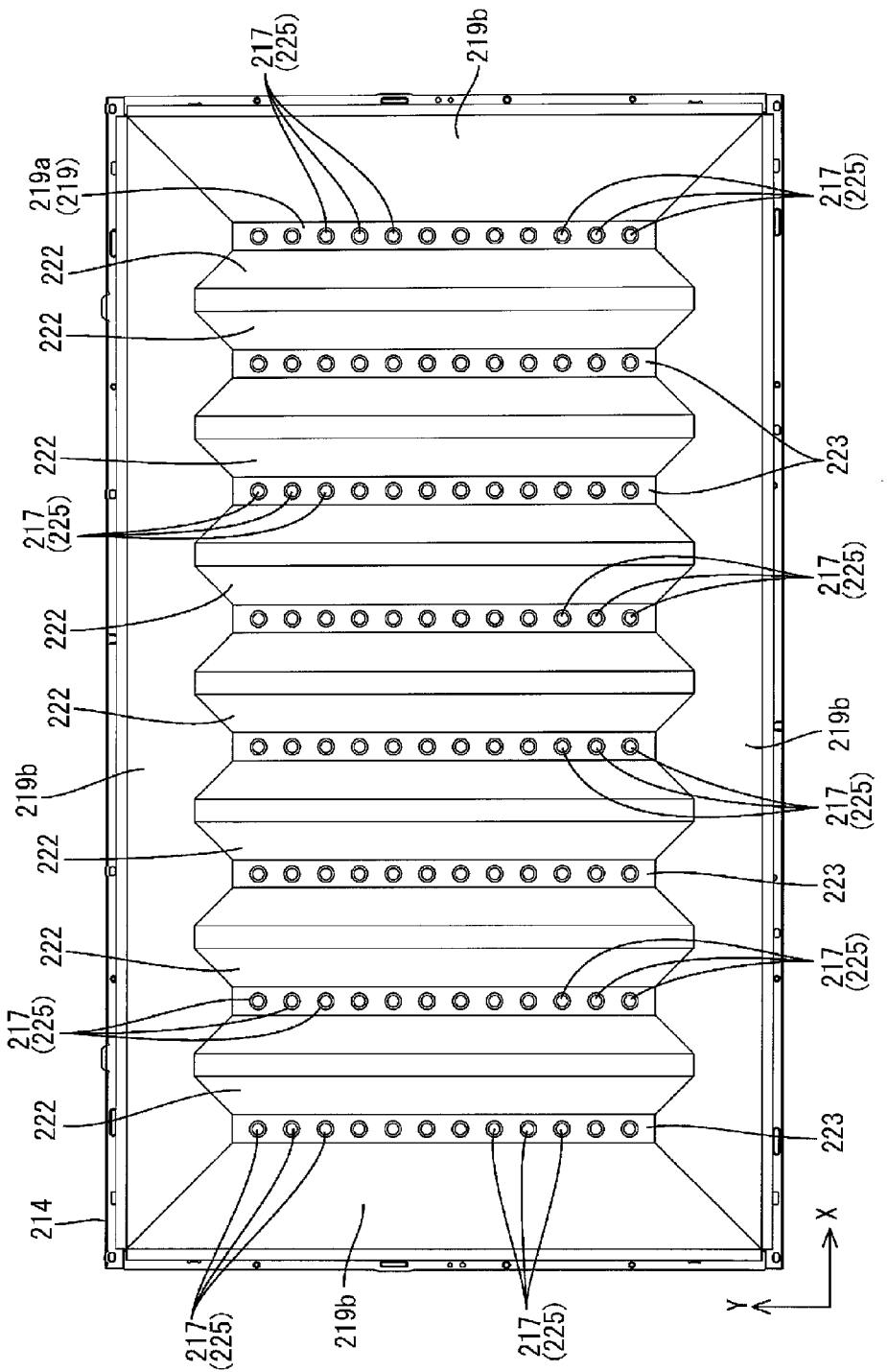
FIG. 24 is a plan view illustrating an arrangement of the LED and the light leading member of the reflection sheet in the chassis according to the third embodiment of the present invention.

As illustrated in FIG. 24, the LEDs 217 of the present embodiment are arranged in rows and columns on an LED board 218, in which the row direction matches the X-axis direction and the column direction matches the Y-axis direction. The LEDs 217 are arranged such that an arrangement pitch in the Y-axis direction is smaller than an arrangement pitch in the X-axis direction (intervals between LED groups 225 adjacent to each other, which will be described later). In the present embodiment, the LED groups 225 each include the LEDs 217 arranged linearly in the Y-axis direction with a relatively small arrangement pitch between the adjacent LEDs 217. Thus, on the LED board 218, the LED groups 225 (here, eight LED groups 225) each including the LEDs 217 arranged linearly in the Y-axis direction are arranged in the X-axis direction, i.e., in a direction perpendicular to the Y-axis direction which is an arrangement direction of the LEDs 217 included in the LED group 225, with a predetermined distance therebetween. The LEDs 217 included in the LED group 225 are arranged on a bottom plate 214a of a chassis 214 so as to across substantially the entire length in the short-side direction of the bottom plate 214. The arrangement pitches of the LEDs 217 included in the LED group 225, i.e., the intervals between the LEDs 217 adjacent to each other in the Y-axis direction, are substantially the same. The intervals between the LEDs 217 adjacent to each other in the Y-axis direction are sufficiently smaller than the intervals between the LEDs 217 adjacent to each other in the X-axis direction. The intervals between the LED groups 225 (the LEDs 217) adjacent to each other in the X-axis direction are substantially the same.

Figure 25:
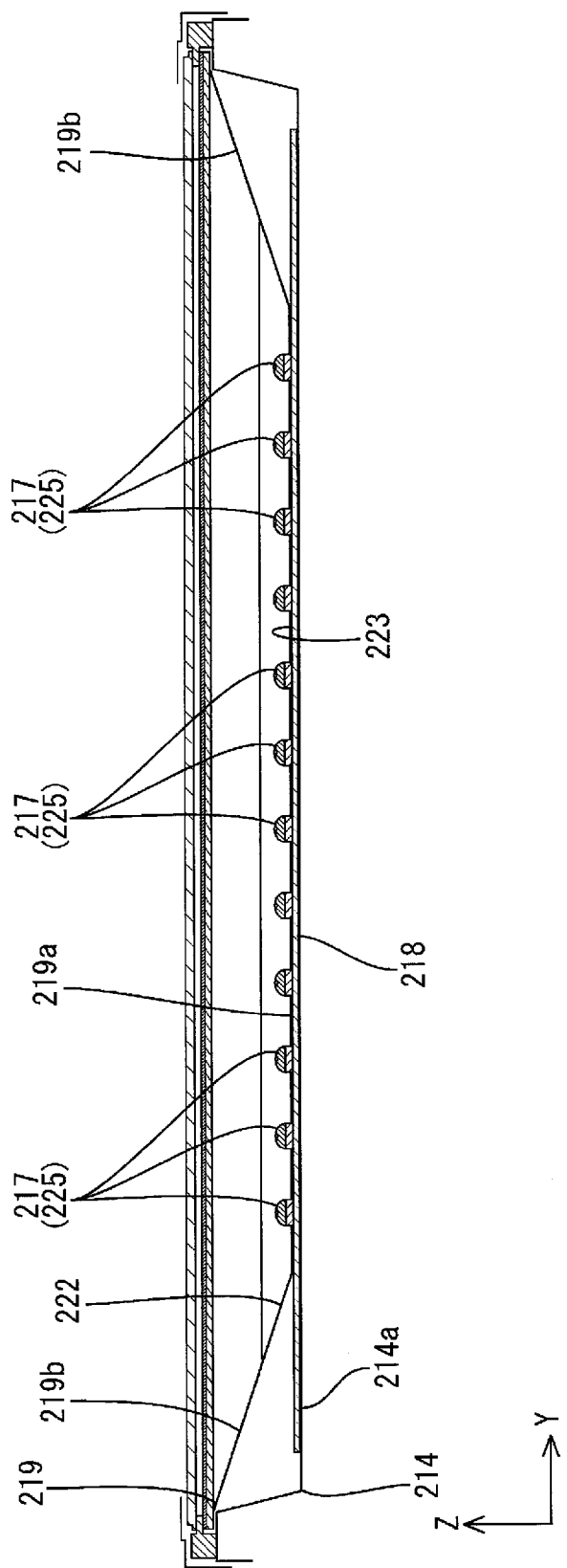
FIG. 25 is a cross-sectional view taken along a short-side direction of the liquid crystal display device.
Figure 26:
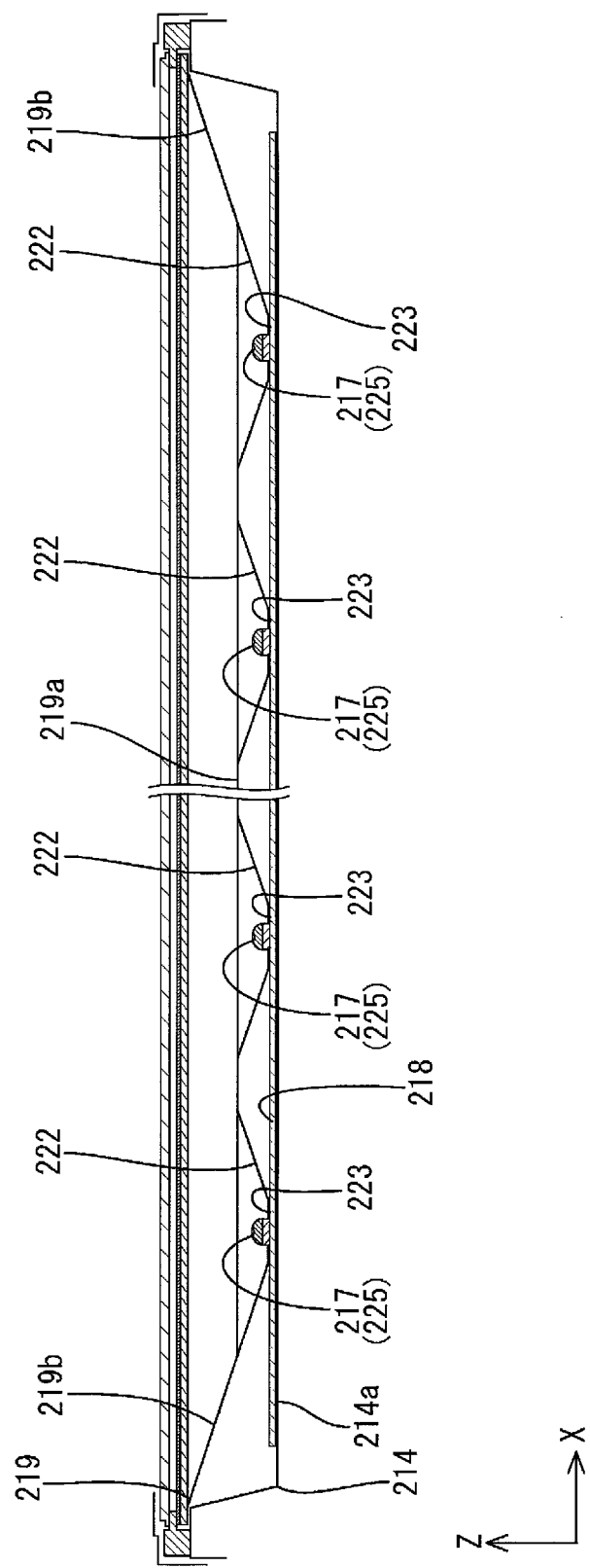
FIG. 26 is a cross-section taken along a long-side direction of the liquid crystal display device.

As illustrated in FIG. 24 to FIG. 26, each light leading member 222 separately surrounds each LED group 225. Specifically, each light leading member 222 extends along the Y-axis direction, i.e., the arrangement direction of the LEDs 217 included in each LED group 225. The light leading member 222 extends on a bottom portion 219a of a reflection sheet 219 over substantially the entire length in the short-side direction of the bottom portion 219a. Thus, the light leading member 222 can collectively surround all of the LEDs 217 (here, 12 LEDs 217) included in the LED group 225. The light leading member 22 has a vertically long quadrangular pyramid shape elongated in the Y-axis direction. The light leading member 222 has a vertically long rectangular cross-section taken along a direction perpendicular (the surface extending along the X-axis direction and the Y-axis direction) to the front direction (the Z-axis direction), i.e., a vertically long rectangular circumferential cross-section. Two of four sides included in each light leading member 222 that face the LED group 225 in the Y-axis direction is continuous to a rising portion 219b of the reflection sheet 219 without a step, and form the same inclination angle with the front direction. Each side in the X-axis direction of the light leading member 222 that are located on each end in the X-direction have this configuration. A support portion 223 of the reflection sheet 219 is formed in an area extending across all of the LEDs 217 included in the LED group 225, and thus the support portion 223 has a rectangular shape elongated in the Y-axis direction. The other parts of the cross section of the above light leading member 222 are substantially the same as those of the light leading member 122 in the above second embodiment, and will not be explained.

As described above, each LED group 225 includes the LEDs 217 linearly arranged in the direction along one side (short side) of the chassis 214, and the light leading member 222 extends in the arrangement direction of the LEDs 217 included in the LED group 225. With this configuration, the light emitted from the LEDs 217 arranged in the direction along the one side of the chassis 214 can be efficiently led toward the light exit side by the light leading member 222 extending along the arrangement direction of the LEDs 217 included in the LED group 225. This is preferable for suppression of uneven brightness and improvement of brightness.

Fourth Embodiment

The fourth embodiment of the present invention will be explained with reference to FIG. 27. In the fourth embodiment, the configuration of an LED 317 is changed. The construction, operations and effects same as the first embodiment will not be explained.

Figure 27:
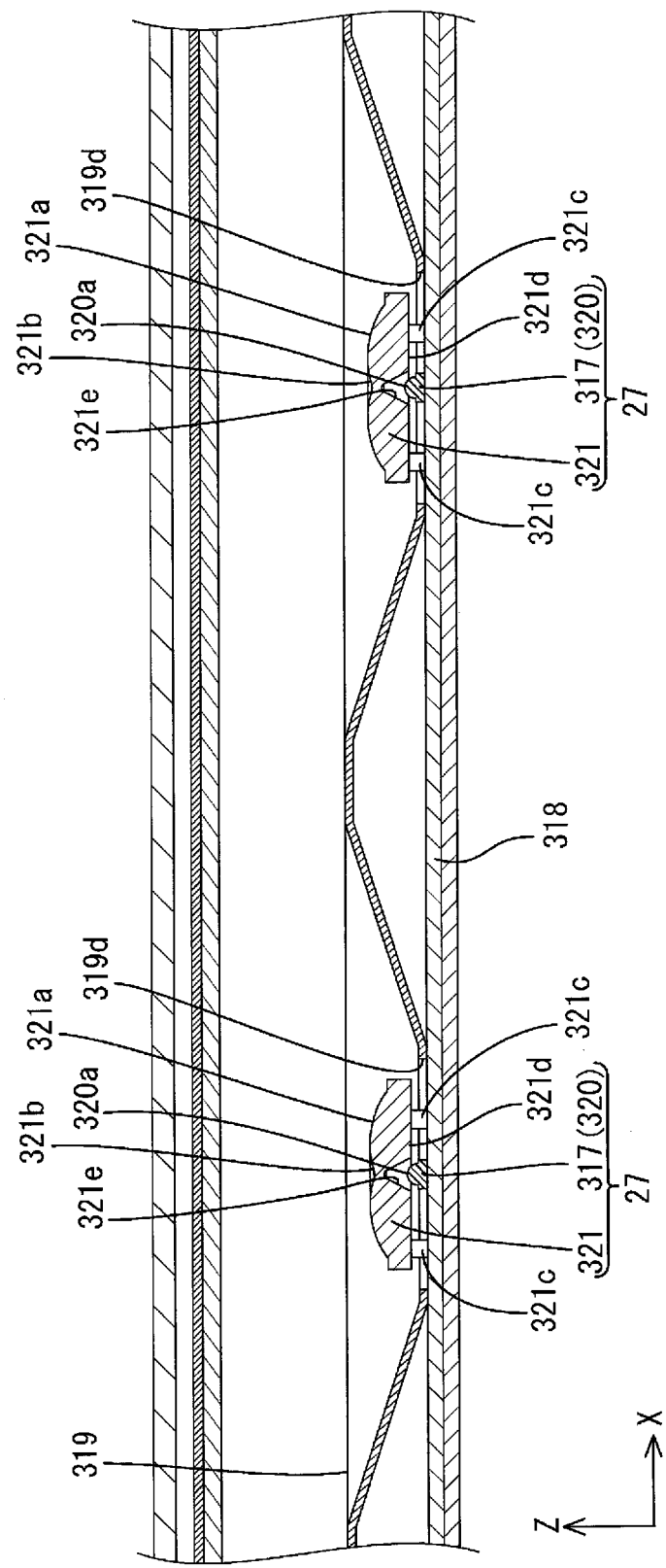
FIG. 27 is a magnified cross-sectional view of a major part illustrating an arrangement of the light sources and the light leading members according to the fourth embodiment of the present invention.

As illustrated in FIG. 27, in the present embodiment, the LED 317 only includes a light emitting portion 320. A lens 321 is provided as a separate member. Namely, the light source 27 of the present embodiment includes the LED 317 consisting of the light emitting portion 320 as one component and the lens 321 as another component. Specifically, the LED 317 including the light emitting portion 320 having an LED chip as a light source and the lens 321 are mounted on an LED board 318 such that the lens 321 face a light emitting surface 320a of the LED 317. The lens 321 has a disk-like shape having a larger diameter than the LED 317. The lens 321 is arranged concentric with the LED 317. The light output surface 321a of the lens 321 has a substantially flat hemispherical shape and has a recess 321b on the middle thereof. Legs 321c protruding toward the rear side are provided on the lens 321, and the legs 321c are attached to the LED board 318. The lens 321 includes a light entrance surface 321d that faces the light emitting surface 320a of the LED 317 with a predetermined distance therebetween by the legs 321c. A second recess 321e is provided on a middle portion of the light entrance surface 321d (a portion facing the LED 317). The reflection sheet 319 includes light source through holes 319 through which the LED 317 and the lens 321 are passed.

As described above, the lens 321 is a separate member from the light emitting portion 320. With this configuration, the light source including the light emitting portion 320 and the lens 321 as separate members can be used. This can reduce the production cost of the light emitting portion 320. Future, this expands the possibility of the optical design of the lens 321, and thus uneven brightness can be suppressed.

Fifth Embodiment

The fifth embodiment of the present invention will be explained with reference to FIG. 28. In the fifth embodiment, alight leading member 422 is a separate member from a reflection sheet 419. The construction, operations and effects same as the first embodiment will not be explained.

Figure 28:
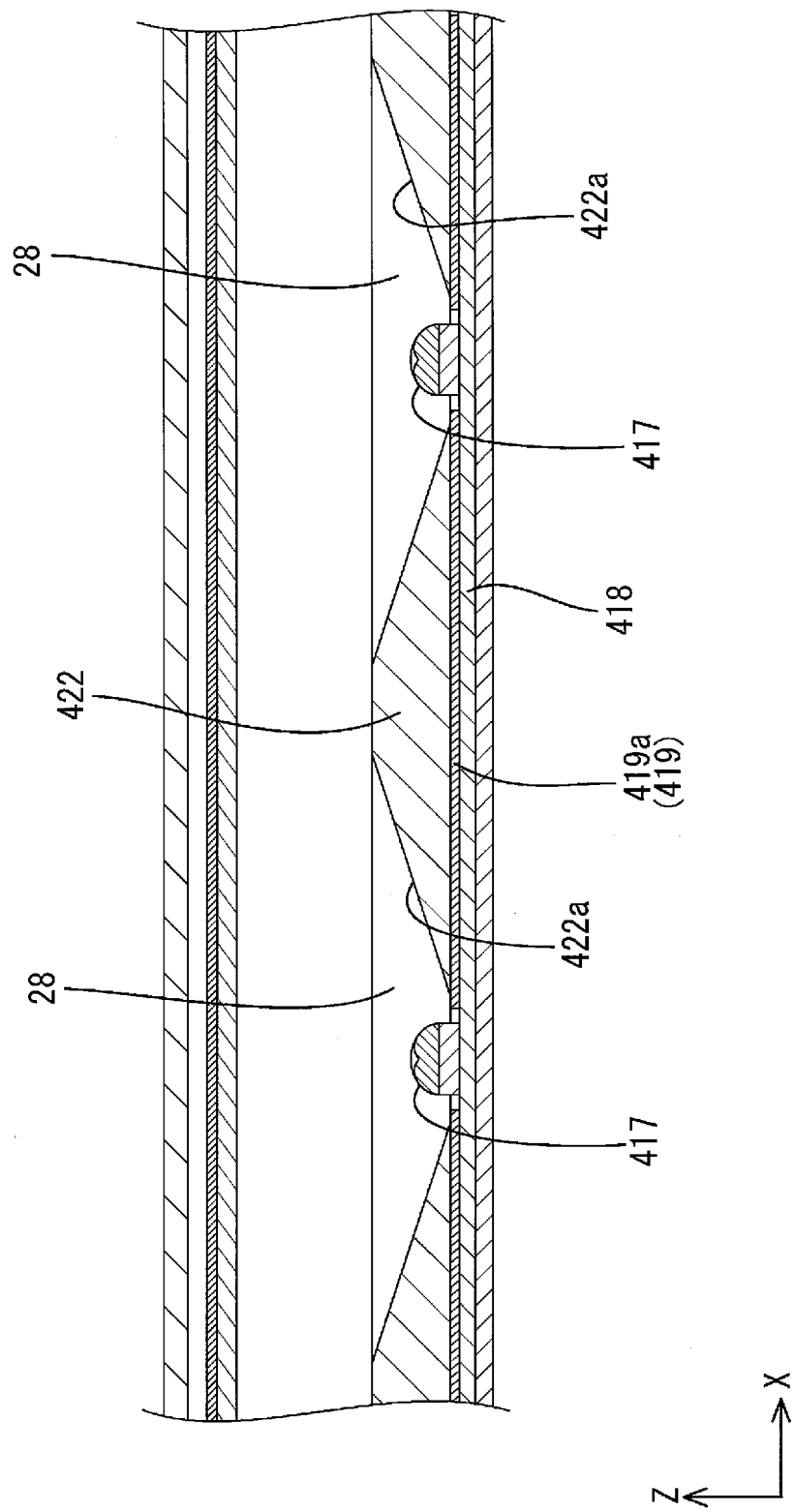
FIG. 28 is a magnified cross-sectional view illustrating an arrangement of the LEDs and the light leading members according to the fifth embodiment of the present invention.

As illustrated in FIG. 28, in the present embodiment, the bottom portion 419a of the reflection sheet 419 flatly-extends along the entire area of the LED board 418. A light leading member 422 as a separate member is arranged on a front surface of the bottom portion 419a. The light leading potion 422 is mad of a synthetic resin and has a white surface that exhibits high light reflectivity. The light leading member 422 has a size enough to cover substantially the entire area of the bottom portion 419a. A light leading recess 28 having an inverted conical shape is located so as to correspond to each LED 417. A circumferential surface of the light leading recess 28 provided the light leading surface 422a.

Other Embodiments

The present invention is not limited to the above embodiments described in the above description and the drawings.

The following embodiments are also included in the technical scope of the present invention, for example.

Figure 29:
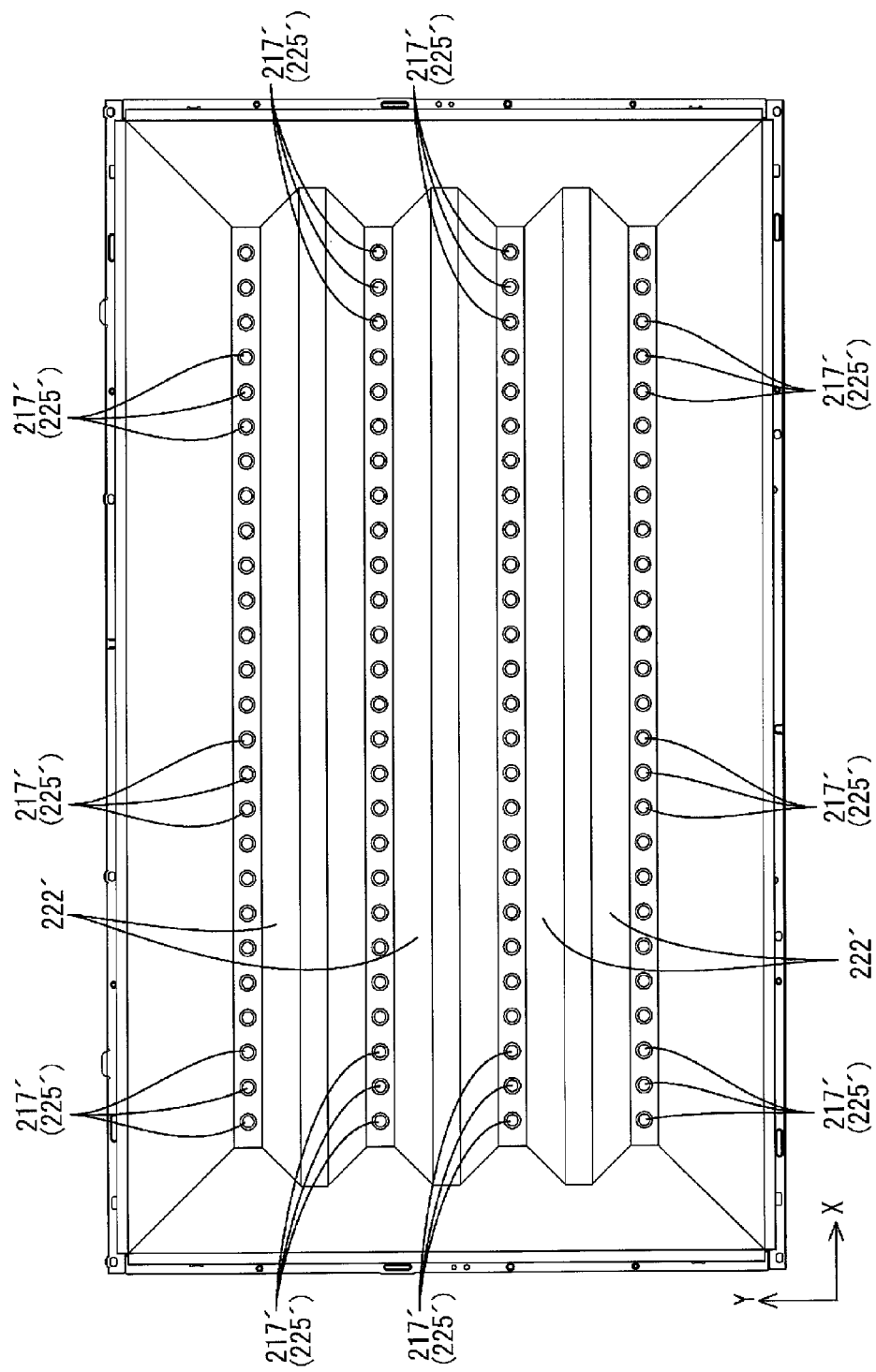
FIG. 29 is a plan view illustrating an arrangement of the LEDs and the light leading member of the reflection sheet in the chassis according to the other embodiment (1) of the present invention.

(1) The following configurations may be included as modifications of the third embodiment. Specifically, as illustrated in FIG. 29, LEDs 217' are arranged with a smaller distance in the X-axis direction than the Y-axis direction. Each LED group 225' includes the LEDs 217' (26 LEDs 217') aligned in the X-axis direction. Each light leading member 222' extends in the X-axis direction so as to collectively surround all of the LEDs 217' included in each LED group 225'.

(2) The specific values of the angle between the light having the peak light intensity and the front direction are not limited to the values used in the above embodiments. The specific values may be suitably changed from the value indicated in FIG. 8. Preferably, the angle is in a range from 20 degrees to 85 degrees, more preferably in a range from 45 degrees to 85 degrees, and still more preferably in a range from 60 degrees to 80 degrees. In addition, the angle can be in a range from 0 degree to 20 degrees.

(3) In the above embodiments, the light intensity distribution of the LED is substantially symmetric. However, it is difficult in practice to have a light intensity distribution that is perfectly symmetric due to manufacturing errors or the like. The light intensity distribution may be slightly uneven and asymmetric in a precise sense (the light intensity distribution may include two or more peak light intensities). In such a case, the angle between the light leading surface and the front direction can be larger than the angle between the light having the highest peak light intensity or the light having the second highest peak light intensity and the front direction.

(4) In the above embodiments, the light source has the light intensity distribution of the light emitted from the LED in which the light traveling in the front direction (the light emitted at the angle of 0 degree in FIG. 8) has the smallest light intensity. However, the light source may have the light intensity distribution in which the light traveling in the front direction has one of the peak light intensities. Even in such a case, preferably, the light traveling in the front direction has the peak light intensity smaller than the peak light intensity of the light inclined with respect to the front direction.

(5) In the above embodiments (particularly in the first embodiment and the sixth modification of the first embodiment), the absolute value of the angle between the light leading surface and the front direction is larger or smaller than the absolute value of the angle between the light having the peak light intensity and the front direction. However, the absolute value of the angle between the light leading surface and the front direction may be substantially the same as the absolute value of the angle between the light having the peak light intensity and the front direction.

(6) The configuration described in the first and second modifications of each of the first and second embodiments (in which the light leading member is configured to surround the LED group) and the configuration described in the fourth and fifth embodiments (in which the lens is a separate member or the light leading member is a member separate from the reflection sheet) may be used in combination.

(7) The configuration described in the third embodiment or the above (1) (in which the LED group and the light leading member extends over the entire length of one side of the LED board) and the configuration described in the above fourth and fifth embodiments may be used in combination.

(8) The configuration described in the third modification of the first embodiment (in which the LEDs and the light leading members are arranged in a staggered manner) and the configuration described in the second embodiment (in which the light leading member has the inverted quadrangular pyramid shape) may be used in a combination.

(9) The configuration described in the fourth and fifth modifications of the first embodiment (in which the light leading member has an arc-like cross-section taken along the front direction) can be applied to the light leading member described in the second embodiment to the fifth embodiments.

(10) The configuration described in the sixth modification of the first embodiment (in which the angle between the light leading surface and the front direction is smaller than the angle between the light having the peak light intensity and the front direction) can be applied to the light leading member described in the second embodiment to the fifth embodiments. Further, the modifications of the first and second embodiments may be suitably used in combination.

(11) The configuration described in the seventh modification of the first embodiment (in which the light leading member has the zigzag cross-section) may be applied to the light leading member described in the second embodiment to the fifth embodiment.

(12) In addition to the cross sections described in the above embodiments (particularly, the first embodiment and the fourth, fifth, and seventh modifications of the first embodiment), the cross section of the light leading member taken along the front direction and the direction intersecting with the front direction may be suitably changed. For example, the cross section of the light leading member may be any other curved shape than arc-like curved shape (for example, a wave shape). Whatever the cross section of the light leading member is, the angle between the light leading member and the front direction can be defined as "an angle between a reference line passing the apex of the light leading member curved closer to the light exit side and the front direction, in which the reference line is located closer to the light exit side than the light leading member."

(13) In the first modification of each of the first and second embodiments, the LED group includes two LEDs arranged along the X-axis direction and two LEDs arranged along the Y-axis direction (in the same number). However, the number of LEDs arranged along the X-axis direction and the number of LEDs arranged along the Y-axis direction may be more than two and may be different from each other.

(14) In the second modification of each of the first and second embodiments, the LED group includes three LEDs arranged along the X-axis direction. However, the LED group may include three LEDs arranged along the Y-axis direction. In such a case, the light leading member may extend in the Y-axis direction.

(15) The number of LEDs included in the LED group is not limited to the number in the first and second modifications of each of the first and second embodiments, the third embodiment, and the above (1). The number of LEDs included in the LED group may be suitably changed. In addition, the number of LEDs included in each of the LED groups may differ from each other. Specifically, one chassis may include LED groups each including four LEDs and LED groups each including three LEDs.

(16) In the first and second modifications of each of the first and second embodiments described above, the third embodiment, and the above (1), the LEDs included in the LED groups are arranged at regular intervals. However, the LEDs included in the LED group may be arranged at irregular intervals in the present invention.

(17) In the above first and second modifications of the each of the first and second embodiments, the third embodiment, and the above (1), the LED groups are arranged at regular intervals. However, the LED groups may be arranged at irregular intervals in the present invention.

(18) In the second embodiment and the modifications of the second embodiment described above, each light leading member has the inverted quadrangular pyramid shape or the inverted triangular pyramid shape. However, the light leading member may have any other inverted pyramid shape such as an inverted pentagonal pyramid shape and an inverted hexagonal pyramid shape. In addition, a cross section of the light leading member that is taken along the direction perpendicular to the front direction may be rhombus or parallelogram.

(19) In addition to the above embodiments, the lighting device may include both of a separate light leading member surrounding one LED and a collective light leading member surrounding a plurality of LEDs (an LED group).

(20) In the above embodiment, the reflection sheet is composed of a single reflection sheet. However, the reflection sheet may be composed of divided reflection sheets. In such a case, preferably, the light leading member is integrally provided with each divided reflection sheet.

(21) In the above first to fourth embodiments, the light leading portion is integrally provided with the reflection sheet by the vacuum forming. However, another forming method such as injection forming, blow forming, and press forming may be employed.

(22) In the above embodiments, the lens controls the light distribution of the LED. However, the lens may not be provided. Another member may be provided to control the light distribution of the LED such that the light having the peak light intensity travels in the direction inclined with respect to the front direction.

(23) In the above embodiments, the LED board has a size enough to cover substantially the entire area of the bottom plate of the chassis. However, the size of the LED board can be suitably changed. For example, the LED board may be smaller than the bottom plate.

(24) In the above embodiments, the reflection sheet has a white surface. However, the color may be milky white or silver, for example.

(25) In the above fifth embodiment, the lighting device may not include the reflection sheet. In such a case, preferably, a light reflection portion having a high light reflectivity is formed on a surface of the LED board.

(26) In the above embodiments, the liquid crystal panel and the chassis are arranged in a vertical position such that the short-side direction of the liquid crystal panel and the chassis matches the vertical direction. However, the liquid crystal panel and the chassis may be arranged in a vertical position such that the long-side direction thereof matches the vertical direction.

(27) In the above embodiments, TFTs are used as switching components of the liquid crystal display device. However, the technology described above can be applied to liquid crystal display devices including switching components other than TFTs (e.g., thin film diode (TFD)). Moreover, the technology can be applied to not only color liquid crystal display devices but also black-and-white liquid crystal display devices.

(28) In the above embodiments, the liquid crystal display device including the liquid crystal panel as a display panel is used. However, the technology can be applied to display devices including other types of display panels.

(29) In the above embodiments, the television device including the tuner is used. However, the technology can be applied to a display device without a tuner.

EXPLANATION OF SYMBOLS

10: liquid crystal display device (display device), 11: liquid crystal panel (display panel), 12, 112: backlight unit (lighting device), 14, 214: chassis, 15: optical member, 17, 117, 217, 317, 417: LED (light source), 18, 218, 318, 418: LED board (light source board), 19, 219, 319, 419: reflection sheet (reflector), 20, 320: light emitting portion, 21, 321: lens, 21a, 321a: light output surface (surface on light exit side), 21b, 321b: recess, 22, 122, 222, 422: light leading member, 22a, 422a: light leading surface, 25, 125, 225: LED group, 27: light source, C: clearance, TV: television device, θ1: angle (angle between the light having peak light intensity and front direction), θ2, θ3: angle (angle between light leading surface and front direction)

The invention claimed is:

1. A lighting device comprising:
a light source with a light intensity distribution in which light having a peak light intensity travels in a direction inclined with respect to a front direction, the light source including a light emitting portion and a lens;
a chassis housing the light source on a mounting surface and including an opening on a light exit side of the lighting device; and
a light leading member provided to extend from the mounting surface toward the light exit side, the light leading member being configured to lead light from the light source toward the light exit side; wherein
the light leading member is inclined with respect to the front direction;
the light leading member includes a light leading surface facing the light source;
the light leading surface is located on a side opposite to the light exit side with respect to an optical path of the light having the peak light intensity, such that the light leading surface does not overlap with the optical path;
each of the angle between the light leading surface and the front direction and the angle between the light having the peak light intensity and the front direction is in a range from 45 degrees to 90 degrees; and
light traveling from the light source in the front direction has a lowest light intensity out of all light emitted from the light source in a range from 0 degrees to 90 degrees after exiting the lens; and
the light intensity distribution gradually increases as an absolute value of an angle with respect to the front direction increases and gradually decreases after the angle with respect to the front direction exceeds a position at which the light having the peak light intensity is provided.

2. The lighting device according to claim 1, wherein the light leading member is inclined such that the light leading surface and the front direction form an angle larger than an angle between the light having the peak light intensity and the front direction.

3. The lighting device according to claim 1, wherein each of the angle between the light leading surface and the front direction and the angle between the light having the peak light intensity and the front direction is in a range from 60 degrees to 80 degrees.

4. The lighting device according to claim 1, wherein
the light source includes a plurality of light sources and the light sources are arranged in a plane in the chassis, and
the light leading member includes a plurality of light leading members and each of the light leading members separately surrounds each of the light sources.

5. The lighting device according to claim 4, wherein the light sources are arranged at regular intervals.

6. The lighting device according to claim 1, wherein
the light source includes a plurality of light sources and the light sources are arranged in a plane such that the light sources are grouped into light source groups, and
the light leading member includes a plurality of light leading members and each of the light leading members separately surrounds each of the light source groups.

7. The lighting device according to claim 6, wherein the light source groups are arranged at an interval larger than an interval between the light sources adjacent to each other included in each of the light source groups.

8. The lighting device according to claim 6, wherein
at least two of the light sources are arranged in a direction along one side of the chassis and at least two of the light sources are arranged in a direction along another side of the chassis perpendicular to the one side, and
the light source groups each include at least four of the light sources arranged in the directions along the one side and the another side of the chassis.

9. The lighting device according to claim 6, wherein
the light sources are linearly arranged in a direction along one side of the chassis,
the light source groups each include the light sources linearly arranged, and
the light leading member extends along an arrangement direction in which the light sources included in each of the light source groups are arranged.

10. A lighting device according to claim 4, wherein
the light leading member has a circular circumferential cross-section.

11. The lighting device according to claim 4, wherein the light leading member has a rectangular circumferential cross-section.

12. The lighting device according to claim 1, wherein the light leading surface is an inclined surface in a cross section of the light leading member taken along the front direction.

13. The lighting device according to claim 1, wherein the light leading surface is an arc-like curved surface in a cross section of the light leading member taken along the front direction.

14. The lighting device according to claim 1, wherein the light leading member extends further to the light exit side than the light source does.

15. The lighting device according to claim 1, further comprising a reflector arranged to cover a surface of the chassis on the light exit side,
wherein the light leading member is integrally formed with the reflector.

16. A display device comprising:
a lighting device according to claim 1; and
a display panel configured to provide display using light from the lighting device.

17. A display according to claim 16 wherein the display is included in a television device.

18. The lighting device of claim 1, wherein the light intensity changes relatively gradually between the angle of 0 degrees and the angle $\theta 1$ ($-\theta 1$) at which the light has the peak light intensity, and the light intensity changes relatively sharply between the angle $\theta 1$ ($-\theta 1$) at which the light has the peak light intensity and the angle of 90 degrees ($-90$ degrees).

* * * * *